United States Patent
Adjaoute

(10) Patent No.: US 11,496,480 B2
(45) Date of Patent: Nov. 8, 2022

(54) SECURING INTERNET-OF-THINGS WITH SMART-AGENT TECHNOLOGY

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 0 days.

(21) Appl. No.: 16/743,009

(22) Filed: Jan. 15, 2020

(65) Prior Publication Data

US 2020/0153839 A1 May 14, 2020

Related U.S. Application Data

(63) Continuation of application No. 15/968,568, filed on May 1, 2018.

(51) Int. Cl.
| G06F 8/77 | (2018.01) |
| H04L 9/40 | (2022.01) |
| G06N 20/00 | (2019.01) |

(52) U.S. Cl.
CPC ........... H04L 63/102 (2013.01); G06N 20/00 (2019.01)

(58) Field of Classification Search
CPC .... G06F 21/55; G06F 21/577; G06F 21/3438; G06F 11/3438; G06F 11/3476; G06F 2216/03; H04L 63/102; G06N 20/00
See application file for complete search history.

(56) References Cited

U.S. PATENT DOCUMENTS

| 5,377,354 A | 12/1994 | Scannell et al. |
| 5,692,107 A | 11/1997 | Simoudis et al. |
| 5,819,226 A | 10/1998 | Gopinathan et al. |
| 5,822,741 A | 10/1998 | Fischthal |
| 6,009,199 A | 12/1999 | Ho |
| 6,026,397 A | 2/2000 | Sheppard |
| 6,029,154 A | 2/2000 | Pettitt |
| 6,122,624 A | 9/2000 | Tetro et al. |
| 6,161,130 A | 12/2000 | Horvitz et al. |

(Continued)

FOREIGN PATENT DOCUMENTS

| DE | 4230419 | 3/1994 |
| EP | 0647903 | 4/1995 |

(Continued)

OTHER PUBLICATIONS

Office Action From U.S. Appl. No. 14/673,895 (dated Oct. 30, 2015).

(Continued)

*Primary Examiner* — Tongoc Tran

(74) *Attorney, Agent, or Firm* — Hovey Williams LLP

(57) ABSTRACT

An Internet-of-things (IoT) mechanizes, computerizes, automates, instruments, includes, and connects a broadly dispersed and extensively diverse universe of unrelated "things" to the Internet, e.g., credit cards, home appliances, industrial machinery, airplanes, cars, municipal water pumps, mobile devices, rain gauges, etc. Each thing is assigned a resident local "smart agent". Or an entity, manifesting remotely only as transaction records and reports, is assigned a virtual smart agent in a network server. These data structures follow, track, record, chart, monitor, characterize, describe, render, and otherwise provide a label and handle on independent things and entities.

14 Claims, 11 Drawing Sheets

(56) References Cited

U.S. PATENT DOCUMENTS

| | | |
|---|---|---|
| 6,254,000 B1 | 7/2001 | Degen et al. |
| 6,272,479 B1 | 8/2001 | Farry et al. |
| 6,330,546 B1 | 12/2001 | Gopinathan et al. |
| 6,347,374 B1 | 2/2002 | Drake et al. |
| 6,424,997 B1 | 7/2002 | Buskirk, Jr. et al. |
| 6,453,246 B1 | 9/2002 | Agrafiotis et al. |
| 6,535,728 B1 | 3/2003 | Perfit et al. |
| 6,601,048 B1 | 7/2003 | Gavan et al. |
| 6,647,379 B2 | 11/2003 | Howard et al. |
| 6,711,615 B2 | 3/2004 | Porras et al. |
| 6,782,375 B2 | 8/2004 | Abdel-Moneim et al. |
| 6,889,207 B2 | 5/2005 | Slemmer et al. |
| 7,007,067 B1 | 2/2006 | Azvine et al. |
| 7,036,146 B1 | 4/2006 | Goldsmith |
| 7,089,592 B2 | 8/2006 | Adjaoute |
| 7,159,208 B2* | 1/2007 | Keeley .................... G06F 8/34 717/109 |
| 7,165,037 B2 | 1/2007 | Lazarus et al. |
| 7,251,624 B1 | 7/2007 | Lee et al. |
| 7,403,922 B1 | 7/2008 | Lewis et al. |
| 7,406,502 B1 | 7/2008 | Oliver et al. |
| 7,433,960 B1 | 10/2008 | Dube et al. |
| 7,457,401 B2 | 11/2008 | Lawyer et al. |
| 7,464,264 B2 | 12/2008 | Goodman et al. |
| 7,483,947 B2 | 1/2009 | Starbuck et al. |
| 7,562,122 B2 | 7/2009 | Oliver et al. |
| 7,590,970 B2* | 9/2009 | Bromley .............. G05B 19/056 700/17 |
| 7,630,956 B2* | 12/2009 | Wyatt .................. G06F 16/283 |
| 7,631,362 B2 | 12/2009 | Ramsey |
| 7,668,769 B2 | 2/2010 | Baker et al. |
| 7,685,083 B2* | 3/2010 | Fairweather ....... G06K 13/0825 706/45 |
| 7,813,937 B1 | 10/2010 | Pathria et al. |
| 7,835,919 B1 | 11/2010 | Bradley et al. |
| 7,853,469 B2 | 12/2010 | Maitland et al. |
| 7,877,421 B2* | 1/2011 | Berger ................. G06F 16/288 707/809 |
| 8,015,108 B2 | 9/2011 | Haggerty et al. |
| 8,027,439 B2 | 9/2011 | Zoldi et al. |
| 8,036,981 B2 | 10/2011 | Shirey et al. |
| 8,041,597 B2 | 10/2011 | Li et al. |
| 8,090,648 B2 | 1/2012 | Zoldi et al. |
| 8,401,990 B2* | 3/2013 | Silsby ................. G06F 16/283 707/601 |
| 8,458,069 B2 | 6/2013 | Adjaoute |
| 8,484,301 B2 | 7/2013 | Wilson et al. |
| 8,548,137 B2 | 10/2013 | Zoldi et al. |
| 8,555,077 B2 | 10/2013 | Davis et al. |
| 8,561,007 B2 | 10/2013 | Challenger et al. |
| 8,572,736 B2 | 10/2013 | Lin |
| 8,744,979 B2 | 6/2014 | Sundelin et al. |
| 8,805,737 B1 | 8/2014 | Chen et al. |
| 9,069,737 B1* | 6/2015 | Kimotho ............. G06F 11/0793 |
| 9,264,442 B2 | 2/2016 | Bart et al. |
| 9,400,879 B2 | 7/2016 | Tredoux et al. |
| 9,721,296 B1 | 8/2017 | Chrapko |
| 9,898,741 B2 | 2/2018 | Siegel et al. |
| 10,339,606 B2 | 7/2019 | Gupta et al. |
| 10,817,530 B2* | 10/2020 | Siebel ................. G06Q 10/06 |
| 2002/0147754 A1 | 10/2002 | Dempsey et al. |
| 2002/0188533 A1 | 12/2002 | Sanchez et al. |
| 2002/0194119 A1 | 12/2002 | Wright et al. |
| 2003/0009495 A1 | 1/2003 | Adjaoute |
| 2003/0084449 A1 | 5/2003 | Chane et al. |
| 2003/0158751 A1 | 8/2003 | Suresh et al. |
| 2004/0073634 A1 | 4/2004 | Haghpassand |
| 2004/0111363 A1 | 6/2004 | Trench et al. |
| 2004/0153555 A1 | 8/2004 | Haverinen et al. |
| 2004/0225473 A1 | 11/2004 | Aoki et al. |
| 2006/0041464 A1 | 2/2006 | Powers et al. |
| 2006/0149674 A1 | 7/2006 | Cook et al. |
| 2006/0171509 A1* | 8/2006 | Berthaud ............ H04L 41/5019 379/1.04 |
| 2006/0212350 A1 | 9/2006 | Ellis et al. |
| 2007/0067853 A1 | 3/2007 | Ramsey |
| 2007/0112667 A1 | 5/2007 | Rucker |
| 2007/0124246 A1 | 5/2007 | Lawyer et al. |
| 2007/0174164 A1 | 7/2007 | Biffle et al. |
| 2007/0174214 A1 | 7/2007 | Welsh et al. |
| 2007/0239604 A1 | 10/2007 | O'Connell et al. |
| 2007/0239936 A1* | 10/2007 | Gluhovsky ......... G06F 12/0802 711/118 |
| 2008/0086365 A1 | 4/2008 | Zollino et al. |
| 2008/0104101 A1 | 5/2008 | Kirshenbaum et al. |
| 2008/0162259 A1 | 7/2008 | Patil et al. |
| 2008/0281743 A1 | 11/2008 | Pettit |
| 2009/0307028 A1 | 12/2009 | Eldon et al. |
| 2010/0027527 A1 | 2/2010 | Higgins et al. |
| 2010/0082751 A1 | 4/2010 | Meijer et al. |
| 2010/0115610 A1 | 5/2010 | Tredoux et al. |
| 2010/0125470 A1 | 5/2010 | Chisholm |
| 2010/0191634 A1 | 7/2010 | Macy et al. |
| 2010/0228656 A1 | 9/2010 | Wasserblat et al. |
| 2010/0305993 A1 | 12/2010 | Fisher |
| 2011/0016041 A1 | 1/2011 | Scragg |
| 2011/0035440 A1 | 2/2011 | Henkin et al. |
| 2011/0055196 A1 | 3/2011 | Sundelin et al. |
| 2011/0055264 A1 | 3/2011 | Sundelin et al. |
| 2011/0238566 A1 | 9/2011 | Santos |
| 2011/0258049 A1 | 10/2011 | Ramer et al. |
| 2011/0276468 A1 | 11/2011 | Lewis et al. |
| 2011/0307382 A1 | 12/2011 | Siegel et al. |
| 2012/0047072 A1 | 2/2012 | Larkin |
| 2012/0137367 A1 | 5/2012 | Dupont et al. |
| 2012/0203698 A1 | 8/2012 | Duncan et al. |
| 2012/0226613 A1 | 9/2012 | Adjaoute |
| 2013/0018796 A1 | 1/2013 | Kolhatkar et al. |
| 2013/0204755 A1 | 8/2013 | Zoldi et al. |
| 2013/0305357 A1 | 11/2013 | Ayyagari et al. |
| 2014/0082434 A1 | 3/2014 | Knight et al. |
| 2014/0149128 A1 | 5/2014 | Getchius |
| 2014/0180974 A1 | 6/2014 | Kennel et al. |
| 2014/0279803 A1 | 9/2014 | Burbank et al. |
| 2015/0032589 A1 | 1/2015 | Adjaoute |
| 2015/0039512 A1 | 2/2015 | Adjaoute |
| 2015/0039513 A1 | 2/2015 | Adjaoute |
| 2015/0046181 A1 | 2/2015 | Adjaoute |
| 2015/0046224 A1 | 2/2015 | Adjaoute |
| 2015/0046332 A1 | 2/2015 | Adjaoute |
| 2015/0066771 A1 | 3/2015 | Adjaoute |
| 2015/0073981 A1 | 3/2015 | Adjaoute |
| 2015/0081324 A1 | 3/2015 | Adjaoute |
| 2015/0095146 A1 | 4/2015 | Adjaoute |
| 2015/0161609 A1 | 6/2015 | Christner |
| 2015/0193263 A1 | 7/2015 | Nayyar et al. |
| 2015/0195300 A1 | 7/2015 | Adjaoute |
| 2015/0206214 A1 | 7/2015 | Adjaoute |
| 2015/0213276 A1 | 7/2015 | Adjaoute |
| 2015/0227935 A1 | 8/2015 | Adjaoute |
| 2015/0279155 A1 | 10/2015 | Chun et al. |
| 2015/0339586 A1 | 11/2015 | Adjaoute |
| 2015/0339672 A1 | 11/2015 | Adjaoute |
| 2015/0339673 A1 | 11/2015 | Adjaoute |
| 2015/0348042 A1 | 12/2015 | Jivraj et al. |
| 2016/0055427 A1 | 2/2016 | Adjaoute |
| 2016/0063502 A1 | 3/2016 | Adjaoute |
| 2016/0071017 A1 | 3/2016 | Adjaoute |
| 2016/0078367 A1 | 3/2016 | Adjaoute |
| 2016/0086185 A1 | 3/2016 | Adjaoute |
| 2016/0110512 A1 | 4/2016 | Adjaoute |
| 2016/0260102 A1 | 9/2016 | Nightengale et al. |
| 2016/0275289 A1* | 9/2016 | Sethumadhavan ...... G06F 21/52 |
| 2017/0006135 A1* | 1/2017 | Siebel ................... H04L 69/40 |
| 2017/0006141 A1* | 1/2017 | Bhadra ................ H04W 84/18 |
| 2017/0083386 A1* | 3/2017 | Wing ................. G06Q 10/10 |
| 2017/0270534 A1 | 9/2017 | Zoldi et al. |
| 2017/0289176 A1* | 10/2017 | Chen ................... H04L 63/1416 |
| 2017/0347283 A1* | 11/2017 | Kodaypak ............ H04L 41/022 |
| 2018/0032723 A1* | 2/2018 | Danger ................ G06F 11/10 |
| 2018/0040064 A1 | 2/2018 | Grigg et al. |
| 2018/0048710 A1* | 2/2018 | Altin ................... H04L 67/12 |
| 2018/0053114 A1 | 2/2018 | Adjaoute |

(56) References Cited

U.S. PATENT DOCUMENTS

| | | | |
|---|---|---|---|
| 2018/0151045 A1* | 5/2018 | Kim | G08B 21/02 |
| 2018/0182029 A1 | 6/2018 | Vinay | |
| 2018/0208448 A1* | 7/2018 | Zimmerman | H04W 4/70 |
| 2018/0253657 A1 | 9/2018 | Zhao et al. | |
| 2019/0007517 A1* | 1/2019 | Jagannath | G01D 5/00 |
| 2019/0156417 A1 | 5/2019 | Zhao et al. | |
| 2019/0213498 A1 | 7/2019 | Adjaoute | |
| 2019/0236695 A1 | 8/2019 | McKenna et al. | |
| 2019/0250899 A1* | 8/2019 | Riedl | H04L 9/0841 |
| 2019/0265971 A1 | 8/2019 | Behzadi et al. | |
| 2019/0278777 A1 | 9/2019 | Malik et al. | |

FOREIGN PATENT DOCUMENTS

| | | |
|---|---|---|
| EP | 0631453 | 12/2001 |
| WO | 9406103 | 3/1994 |
| WO | 9501707 | 1/1995 |
| WO | 9628948 | 9/1996 |
| WO | 9703533 | 1/1997 |
| WO | 98/32086 | 7/1998 |

OTHER PUBLICATIONS

Office Action From U.S. Appl. No. 14/673,895 (dated Feb. 12, 2016).
Office Action From U.S. Appl. No. 14/673,895 (dated Jul. 14, 2017).
Office Action From U.S. Appl. No. 14/673,895 (dated Oct. 2, 2017).
Office Action From U.S. Appl. No. 14/690,380 (dated Jul. 15, 2015).
Office Action From U.S. Appl. No. 14/690,380 (dated Dec. 3, 2015).
Office Action From U.S. Appl. No. 14/690,380 (dated Jun. 30, 2016).
Office Action From U.S. Appl. No. 14/690,380 (dated Nov. 17, 2016).
Office Action From U.S. Appl. No. 14/690,380 (dated Jun. 27, 2017).
Office Action From U.S. Appl. No. 14/690,380 (dated Nov. 20, 2017).
"10 Popular health care provider fraud schemes" by Charles Piper, Jan./Feb. 2013, Fraud Magazine, www.fraud-magazine com.
Report to the Nations on Occupational Fraud and Abuse, 2012 Global Fraud Study, copyright 2012, 76 pp., Association of Certified Fraud Examiners, Austin, TX.
Big Data Developments in Transaction Analytics, Scott Zoldi, Credit Scoring and Credit Control XIII Aug. 28-30, 2013 Fair Isaacs Corporation (FICO).
Credit card fraud detection using artificial neural networks tuned by genetic algorithms, Dissertation: Carsten A. W. Paasch, Copyright 2013 Proquest, LLC.
Fraud Detection Using Data Analytics in the Healthcare Industry, Discussion Whitepaper, ACL Services Ltd., (c) 2014, 8pp.
Fraud Detection of Credit Card Payment System by Genetic Algorithm, K.RamaKalyani, D. UmaDevi Department of Computer Science, Sri Mittapalli College of Engineering, Guntur, AP, India., International Journal of Scientific & Engineering Research vol. 3, Issue 7, Jul. 1, 2012, ISSN 2229-5518.
Healthcare Fraud Detection, http://IJINIIW.21ct.com'solutions/healthcare-fraud-detection/, (c) 2013 21CT, Inc.
Prevent Real-time fraud prevention, brochure, Brighterion, Inc. San Francisco, CA.
"Agent-Based modeling: Methods and Techniques for Simulating Human Systems", Eric Bonabeau, Icosystem Corporation, 545 Concord Avenue, Cambridge, MA 02138, 7280-7287; PNAS; May 14, 2002; vol. 99; suppl. 3; www.onas.org/cgi/doi/10.1073/pnas.082080899.
Office Action From U.S. Appl. No. 16/168,566 (dated Mar. 4, 2020).
Office Action From U.S. Appl. No. 14/522,463 (dated Mar. 24, 2020).
Office Action From U.S. Appl. No. 16/205,909 (dated Apr. 22, 2020).
Office Action From U.S. Appl. No. 16/398,917 (dated Mar. 11, 2020).
Office Action From U.S. Appl. No. 16/369,626 (dated Jun. 2, 2020).
Raid, Feb. 28, 2014, www.prepressure.com, printed through www.archive.org (Year: 2014).
Clarke et al., Dynamic Forecasting Behavior by Analysts Theory and Evidence, 2005, Journal of Financial Economics (Year:2005).
Data Compaction, 2013, Wikipedia, printed through www.archive.org (date is in the URL in YYYYMMDD format) (Year:2013).
Data Consolidation, 2014, Techopedia, printed through www.archive org (date is in the URL in YYYYMMDD format) (Year:2014).
Data Mining Mar. 31, 2014. Wikipedia, Printed through www.archive.org, date is in the URL in YYYYMMDD format (Year:2014).
Data Warehousing—Metadata Concepts, Mar. 24, 2014, TutorialsPoint, printed through www.archive.org (Date is in the URP in YYYMMDD format) (Year:2014).
Dave, Kushal, Steve Lawrence, and David M. Pennock. "Mining the peanut gallery: Opinion exliation and semantic classification of product reviews." Proceedings of the 12th international conference on Worldwide Web. ACM. 2003.
I Need Endless Rolling List, 2007, QuinStreet, Inc. (Year: 2007).
Office Action From U.S. Appl. No. 14/243,097 (dated Jun. 16, 2015).
Office Action From U.S. Appl. No. 14/243,097 (dated Nov. 5, 2018).
Office Action From U.S. Appl. No. 14/522,463 (dated Dec. 1, 2015).
Office Action From U.S. Appl. No. 14/522,463 (dated Feb. 11, 2019).
Office Action From U.S. Appl. No. 14/522,463 (dated Jun. 20, 2018).
Office Action From U.S. Appl. No. 14/522,463 (dated Jun. 5, 2015).
Office Action From U.S. Appl. No. 14/522,463 (dated Oct. 10, 2018).
Office Action From U.S. Appl. No. 14/613,383 (dated Apr. 23, 2018).
Office Action From U.S. Appl. No. 14/613,383 (dated Aug. 14, 2015).
Office Action From U.S. Appl. No. 14/613,383 (dated Dec. 13, 2018).
Yang,Yiming. "Expert network: Effective and efticient learning from human decisions in text categorization and retrieval." Proceedings of the 17th annual international ACM SIGIR conference on Research and development in information retrieval Springer-Verlag New York, Inc., 1994.
"2000 Internet Fraud Statistics," National Fraud Information Center web site, http://www.fraud.org, 2001.
"AXENT Technologies' NetProwlerTM and Intruder AlertTM", Hurwitz Report, Hurwitz Group, Inc., Sep. 2000.
"CBA 1994 Fraud Survey," California Bankers Association web site, http://www.calbankers.com/legal/fraud.html, Jun. 1996.
"Check Fraud Against Businesses Proliferates," Better Business Bureau web site, http://www.bbb.org/library/checkfraud.asp, 2000.
"Check Fraud Statistics," National Check Fraud Center web site, http://www.ckfraud.org/statistics.html, Date Unkonwn.
"Consumers and Business Beware of Advance Fee Loan and Credit Card Fraud," Better Business Bureau web site, http://www.bbb.org/library/feeloan.asp, 20003.
"CyberSource Fraud Survey," CyberSource, Inc., web site, http://www.cybersource.com/solutions/risk_management/us_fraud_survey.xml, Date Unknown.
"EFalcon Helps E-Merchants Control Online Fraud," Financial Technology Insights Newsletter, HNC Software, Inc., Aug. 2000.
"Guidelines to Healthcare Fraud," National health care Anti-Fraud Association web site, http://www.nhcaa.org/factsheet_guideline.html, Nov. 19, 1991.
"Health Insurance Fraud," http://www.helpstopcrime.org, Date Unknown.
"HIPPA Solutions: Waste, Fraud, and Abuse," ViPS, Inc., web site, http://www.vips.com/hippa/combatwaste.html, 2001.
"HNC Insurance Solutions Introduces Spyder Software for Healthcare Fraud and Abuse Containment," HNC Software, Inc., press release, Dec. 4, 1998.
"Homeowners Insurance Fraud," http://www.helpstopcrime.org, Date Unknown.

(56) References Cited

OTHER PUBLICATIONS

"Insurance Fraud: The Crime You Pay For," http://www.insurancefraud.org/facts.html, Date Unknown.
"PRISM FAQ", Nestor, Inc., www.nestor.com, Date Unknown.
"SET Secure Electronic Transaction Sepcification," Book 1: Business Description, May 1997.
"Telemarketing Fraud Revisited," Better Business Bureau web site, http://www.bbb.org/library/tele.asp, 2000.
"The Impact of Insurance Fraud," Chapter 5, Ohio Insurance Facts, Ohio Insurance Institute, 2000.
"VeriCompTM Claimant," HNC Software, Inc., web site, 2001.
"What is Insurance Fraud?," http://www.helpstopcrime.rog, Date Unkonwn.
"Wireless Fraud FAQ," World of Wireless Communications web site, http://www.wow-com/consumer/faq/articles.cfm?textonly=1&ID=96, Date Unknown.
"Workers Compensation Fraud," http://www.helpstopcrime.org, Date Unknown.
A. Aadjaoute, "Responding to the e-Commerce Promise with Non-Algorithmic Technology," Handbook of E-Business, Chapter F2, edited by J. Keyes, Jul. 2000.
A. Valdes and H. Javitz,"The SRI IDES Statistical Anomaly Detector," May 1991.
D. Anderson, T. Frivold, and A. Valdes, "NExt-Generation intrusion Detection Expert System (NIDES): A Summary," SRI Computer Science Laboratory technical report SRI-CSL-95-07, May 1995.
Debar et al., "Neural network Component for an Intrustion Detection System", Proceedings for the Computer Society Symposium on Research in Security and Privacy, vol. SYMP.13, May 4, 1992, 240-250.
Denault et al., "Intrusion Detection: approach and performance issues of the SECURENET system", Computers and Security, 13 (1994), 495-508.
John J. Xenakis, 1990, InformationWeek, 1990. n296,22.
K. G. DeMarrais, "Old-fashioned check fraud still in vogue," Bergen record Corp. web site, http://www.bergen.com/biz/savvy24200009242.htm, Sep. 24, 2000.
M. B. Guard, "Calling Card Fraud—Travelers Beward!," http://www.bankinfo.com/security/scallingcardhtml, Jun. 11, 1998.
Maria Seminerio, Dec. 13, 1999, PC week, 99.
Office Action from U.S. Appl. No. 09/810,313 (dated Jun. 22, 2005).
Office Action from U.S. Appl. No. 16/424,187 (dated Feb. 26, 2021).
Office Action from U.S. Appl. No. 16/226,246 (dated Dec. 15, 2020).
Ex Parte Quayle Action from U.S. Appl. No. 16/369,626 (dated Jan. 7, 2021).
Office Action From U.S. Appl. No. 14/454,749 (dated Feb. 3, 2017).
Office Action From U.S. Appl. No. 14/514,381 (dated Dec. 31, 2014).
Office Action From U.S. Appl. No. 14/514,381 (dated May 13, 2015).
Office Action From U.S. Appl. No. 14/514,381 (dated Jan. 10, 2018).
Office Action From U.S. Appl. No. 14/514,381 (dated Apr. 2, 2018).
Office Action From U.S. Appl. No. 14/815,848 (dated Sep. 30, 2015).
Office Action From U.S. Appl. No. 14/815,848 (dated Mar. 14, 2016).
Office Action From U.S. Appl. No. 14/815,934 (dated Sep. 30, 2015).
Office Action From U.S. Appl. No. 14/815,934 (dated Feb. 11, 2016).
Office Action From U.S. Appl. No. 14/815,934 (dated Sep. 23, 2016).
Office Action From U.S. Appl. No. 14/815,934 (dated Apr. 7, 2017).
Office Action From U.S. Appl. No. 14/815,940 (dated Oct. 1, 2015).
Office Action From U.S. Appl. No. 14/815,940 (dated Dec. 28, 2017).
Office Action From U.S. Appl. No. 14/929,341 (dated Dec. 22, 2015).
Office Action From U.S. Appl. No. 14/929,341 (dated Feb. 4, 2016).
Office Action From U.S. Appl. No. 14/929,341 (dated Aug. 19, 2016).
Office Action From U.S. Appl. No. 14/929,341 (dated Jul. 31, 2018).
Office Action From U.S. Appl. No. 14/938,844 (dated Apr. 11, 2016).
Office Action From U.S. Appl. No. 14/938,844 (dated Jan. 25, 2017).
Office Action From U.S. Appl. No. 14/938,844 (dated May 1, 2017).
Office Action From U.S. Appl. No. 14/938,844 (dated Aug. 23, 2017).
Office Action From U.S. Appl. No. 14/935,742 (dated Mar. 2, 2016).
Office Action From U.S. Appl. No. 14/935,742 (dated Sep. 22, 2016).
Office Action From U.S. Appl. No. 14/935,742 (dated Mar. 29, 2017).
Office Action From U.S. Appl. No. 14/935,742 (dated May 31, 2017).
Office Action From U.S. Appl. No. 14/941,586 (dated Jan. 5, 2017).
Office Action From U.S. Appl. No. 14/941,586 (dated May 2, 2017).
Office Action From U.S. Appl. No. 14/956,392 (dated Feb. 2, 2016).
Office Action From U.S. Appl. No. 14/956,392 (dated Mar. 28, 2016).
Office Action From U.S. Appl. No. 14/956,392 (dated Nov. 3, 2016).
Office Action From U.S. Appl. No. 14/956,392 (dated May 3, 2017).
Office Action From U.S. Appl. No. 14/986,534 (dated May 20, 2016).
Office Action From U.S. Appl. No. 14/986,534 (dated Sep. 7, 2017).
Office Action From U.S. Appl. No. 14/517,771 (dated Jul. 15, 2015).
Office Action From U.S. Appl. No. 14/517,771 (dated Dec. 31, 2015).
Office Action From U.S. Appl. No. 14/517,771 (dated Sep. 8, 2016).
Office Action From U.S. Appl. No. 14/517,771 (dated Sep. 20, 2018).
Office Action From U.S. Appl. No. 14/517,863 (dated Feb. 5, 2015).
Office Action From U.S. Appl. No. 14/517,863 (dated Aug. 10, 2015).
Office Action From U.S. Appl. No. 14/675,453 (dated Jun. 9, 2015).
Office Action From U.S. Appl. No. 14/517,872 (dated Jan. 14, 2015).
Office Action From U.S. Appl. No. 14/517,872 (dated Jul. 31, 2015).
Office Action From U.S. Appl. No. 14/520,361 (dated Feb. 2, 2015).
Office Action From U.S. Appl. No. 14/520,361 (dated Jul. 17, 2015).
Office Action From U.S. Appl. No. 14/520,361 (dated Jul. 11, 2018).
Office Action From U.S. Appl. No. 14/521,386 (dated Jan. 29, 2015).
Office Action From U.S. Appl. No. 14/521,386 (dated Nov. 1, 2018).
Office Action From U.S. Appl. No. 14/521,667 (dated Jan. 2, 2015).
Office Action From U.S. Appl. No. 14/521,667 (dated Jun. 26, 2015).
Office Action From U.S. Appl. No. 14/634,786 (dated Oct. 2, 2015).
Office Action From U.S. Appl. No. 16/856,131 (dated Sep. 24, 2020).
Office Action From U.S. Appl. No. 16/679,819 (dated Sep. 25, 2020).
Office Action From U.S. Appl. No. 16/677,458 (dated Sep. 24, 2020).
Office Action From U.S. Appl. No. 16/264,144 (dated Oct. 16, 2020).
Office Action From U.S. Appl. No. 16/168,566 (dated Dec. 18, 2020).
Office Action From U.S. Appl. No. 15/866,563 (dated Nov. 27, 2020).
Office Action from U.S. Appl. No. 09/810,313 (dated Mar. 24, 2006).
Office Action from U.S. Appl. No. 09/810,313 (dated Nov. 23, 2004).
Office Action from U.S. Appl. No. 11/455,146 (dated Sep. 29, 2009).

(56) References Cited

OTHER PUBLICATIONS

P.A. Porras and P.G. Neumann, "EMERALD: Event Monitoring Enabling Responses to Anomalous Live Disturbances," National Information Systems Security Conference, Oct. 1997.
P.E. Proctor, "Computer Misuse Detection System (CMDSTM) Conepets," SAIC Science and technology Trends, pp. 137-145, Dec. 1996.
S. Abu-Hakima, M. ToLoo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.
Teng et al., "Adaptive real-time anomaly detection using inductively generated sequential patterns", Proceedings of the Computer Society Symposium on research in Security and Privacy, vol. SYMP. 11, May 7, 1990, 278-284.
Office Action from U.S. Appl. No. 14/522,463 (dated Oct. 3, 2019).
Office Action from U.S. Appl. No. 14/522,463 (dated Jul. 18, 2019).
Office Action From U.S. Appl. No. 16/205,909 (dated Dec. 27, 2019).
Office Action From U.S. Appl. No. 16/205,909 (dated Sep. 27, 2019).
Office Action From U.S. Appl. No. 16/398,917 (dated Sep. 26, 2019).
Office Action From U.S. Appl. No. 15/947,790 (dated Nov. 18, 2019).
Office Action From U.S. Appl. No. 14/525,273 (dated Jun. 26, 2018).
Office Action From U.S. Appl. No. 14/525,273 (dated Feb. 9, 2015).
Office Action From U.S. Appl. No. 14/525,273 (dated May 19, 2015).
Office Action From U.S. Appl. No. 15/968,568 (dated Sep. 16, 2019).
Office Action From U.S. Appl. No. 15/961,752 (dated Oct. 3, 2019).
Office Action From U.S. Appl. No. 16/168,566 (dated Sep. 9, 2020).
Office Action From U.S. Appl. No. 16/226,246 (dated Aug. 4, 2020).
Office Action From U.S. Appl. No. 16/184,894 (dated Sep. 21, 2020).
Office Action From U.S. Appl. No. 16/592,249 (dated Sep. 14, 2020).
Office Action From U.S. Appl. No. 16/601,226 (dated Sep. 2, 2020).
Office Action From U.S. Appl. No. 16/674,980 (dated Sep. 3, 2020).
Office Action from U.S. Appl. No. 16/168,566 (dated Mar. 23, 2021).
Office Action from U.S. Appl. No. 16/226,246 (dated Apr. 26, 2021).
Office Action from U.S. Appl. No. 16/264,144 (dated Apr. 23, 2021).
Office Action from U.S. Appl. No. 16/663,452 (dated Mar. 12, 2021).
Office Action from U.S. Appl. No. 16/168,566 (dated Jul. 21, 2021).
Office Action from U.S. Appl. No. 16/264,144 (dated Sep. 22, 2021).
Office Action from U.S. Appl. No. 16/424,187 (dated Sep. 1, 2021).
Office Action from U.S. Appl. No. 16/663,452 (dated Aug. 17, 2021).
Office Action from U.S. Appl. No. 16/424,187 (dated Dec. 9, 2021).

\* cited by examiner

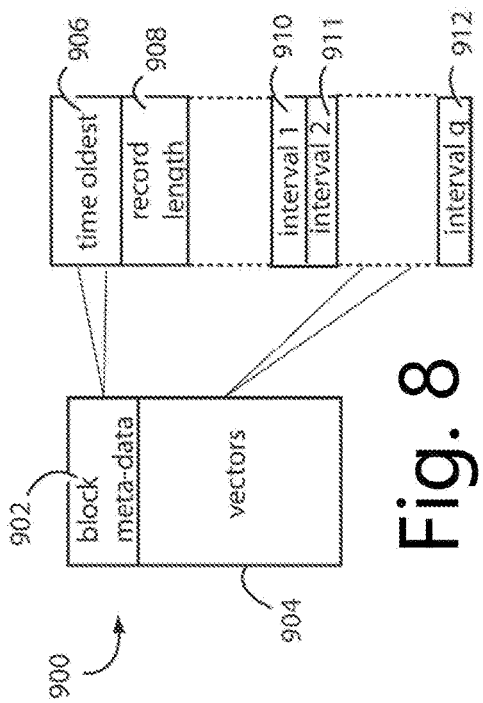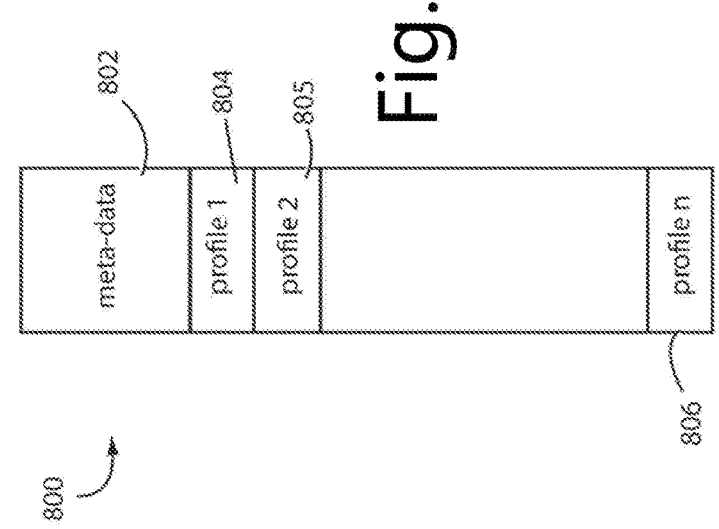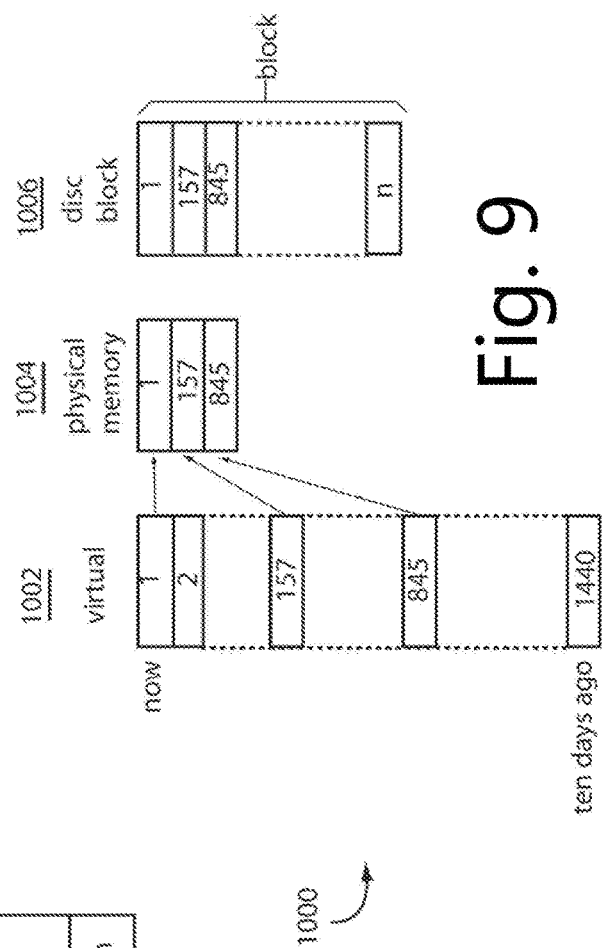

SECURING INTERNET-OF-THINGS WITH SMART-AGENT TECHNOLOGY

RELATED APPLICATIONS

The current patent application is a continuation patent application which claims priority benefit with regard to all common subject matter to identically-titled U.S. patent application Ser. No. 15/968,568, filed May 1, 2018, the contents of which are hereby incorporated by reference in their entirety into the current patent application.

BACKGROUND OF THE INVENTION

Field of the Invention

The present invention relates to artificial intelligence (AI), and more particularly to securing business insider threats detectable by automated system administrator behavior analysis.

Background Art

While AI seems to have only recently captured the attention of humanity, the reality is that AI has generally been around for over 60 years as a technological discipline. In the late 1950's, Arthur Samuel wrote a checkers playing program that could learn from its mistakes and thus, over time, became better at playing the game. MYCIN, the first rule-based expert system, was developed in the early 1970's and was capable of diagnosing blood infections based on the results of various medical tests. The MYCIN system was able to perform better than non-specialist doctors. Thus, in a general sense, while AI may be used to mimic what best humans minds can accomplish, AI is not a patent ineligible mental process as some have contended.

The Internet of Things (IoT) is a new idea for a network of machinery, appliances, and other physical objects or "things" embedded with electronics, software, sensors, and the network connectivity needed to enable automatic data exchanges with other connected devices. How to do that securely and not allow criminal to highjack these things for their own purposes is a major issue and challenge facing the developing IoT.

The Internet of Things adds sensors to everyday items, and is becoming more of a reality every day. IoT enables smart devices like alarms, heating systems and coffee machines, to store data and communicate with one another. Some manufacturers are trying to develop products, from washing machines to water filters, that can sense when a consumer is running low on supplies and automatically place an order without needing so much as to press a button. IBM announced a $3 billion investment to create an Internet of Things unit that will track all the data cast off by devices. Until now, most reports and forecasts of the Internet of Things has seemed a fantasy. That is starting to change.

In many organizations, information travels along well-worn routes. Proprietary information is secured in databases and analyzed in reports before it makes its way up the management chain. Information originating externally is gathered from public sources, collected from the Internet, or acquired from information suppliers.

Nevertheless, the foreseeable pathways of information are changing. The physical world is becoming a type of information system itself. In the Internet of Things, sensors and actuators embedded in physical objects—from roadways to pacemakers—are linked by wired and wireless networks, using the Internet Protocol (IP) that connects the rest of the Internet. These networks spew out enormous volumes of data for analysis.

When objects can both sense the environment and communicate with others, they become agents for understanding and quick response. Physical information systems are now being deployed that go to work without needing human intervention. Automated farming equipment with wireless data links can adjust the way each individual field is farmed. Billboards in Japan now peer back at passersby, assessing how they fit consumer profiles, and adapt the messages displayed based on ad hoc automated calculations.

A widespread adoption of the Internet of Things is expected to take time. Advances in standardized wireless networking technology and communications protocols makes it now possible to collect data from sensors almost anywhere any time. Integrated circuit devices are gaining new capabilities, costing less, and being ever more widely adopted and understood. Surprising and continuing increases in storage and computing power make very large-scale number crunching possible and at next to no cost.

There are a number of issued patents that relate to IoT. The following issued patents have turned up in a search for art that may or may not be relevant to the technologies claimed below: U.S. Pat. Nos. 9,342,779; 9,222,837; and 9,117,949. However, none of these patents disclose or describe the use of artificial intelligence and machine learning based technologies as claimed below.

In any case, there are opportunities in the art to provide an improved component that helps secure IoT through use of smart agents, artificial intelligence, and machine learning.

SUMMARY OF THE INVENTION

Briefly, an Internet-of-things (IoT) embodiment of the present invention mechanizes, computerizes, automates, instruments, includes, and connects a broadly dispersed and extensively diverse universe of unrelated "things" to the Internet, e.g., credit cards, home appliances, industrial machinery, airplanes; cars, municipal water pumps, mobile devices, rain gauges, etc. Each thing is assigned a resident local "smart agent". Or an entity, manifesting remotely only as transaction records and reports, is assigned a virtual smart agent in a network server. These follow, track, record; chart, monitor, characterize, describe, render, and otherwise provide a label and handle on independent things and entities.

Thus, provided is an Internet-of-things (IoT) component, comprising: an electronic smart-agent data structure resident in a computer memory, and accessible through a communications device connectable to the Internet; a means for associating data related to a particular thing or entity to the smart-agent data structure; and a means for collecting data and attributes descriptive of or related to said thing or entity and packing such into the smart-agent data structure. Also provided are a means for rendering a descriptive representation or behavioral analysis of the thing or entity from the data kept within the smart-agent data structure; and a profile for storing in an array any historical data related to said particular thing or entity.

In some embodiments, the component may further include a means for operating alone while disposed within a single said particular thing or entity; and means for communicating said profile, data and attributes with other smart-agent data structures resident in different locations.

Other and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 7 is a diagram of a group of smart agent profiles stored in a custom binary file;

FIG. 8 is a diagram of the file contents of an exemplary smart agent profile;

FIG. 9 is a diagram of a virtual addressing scheme used to access transactions in atomic time intervals by their smart agent profile vectors;

DETAILED DESCRIPTION OF THE INVENTION

Definitions and Overview

Figure 1:
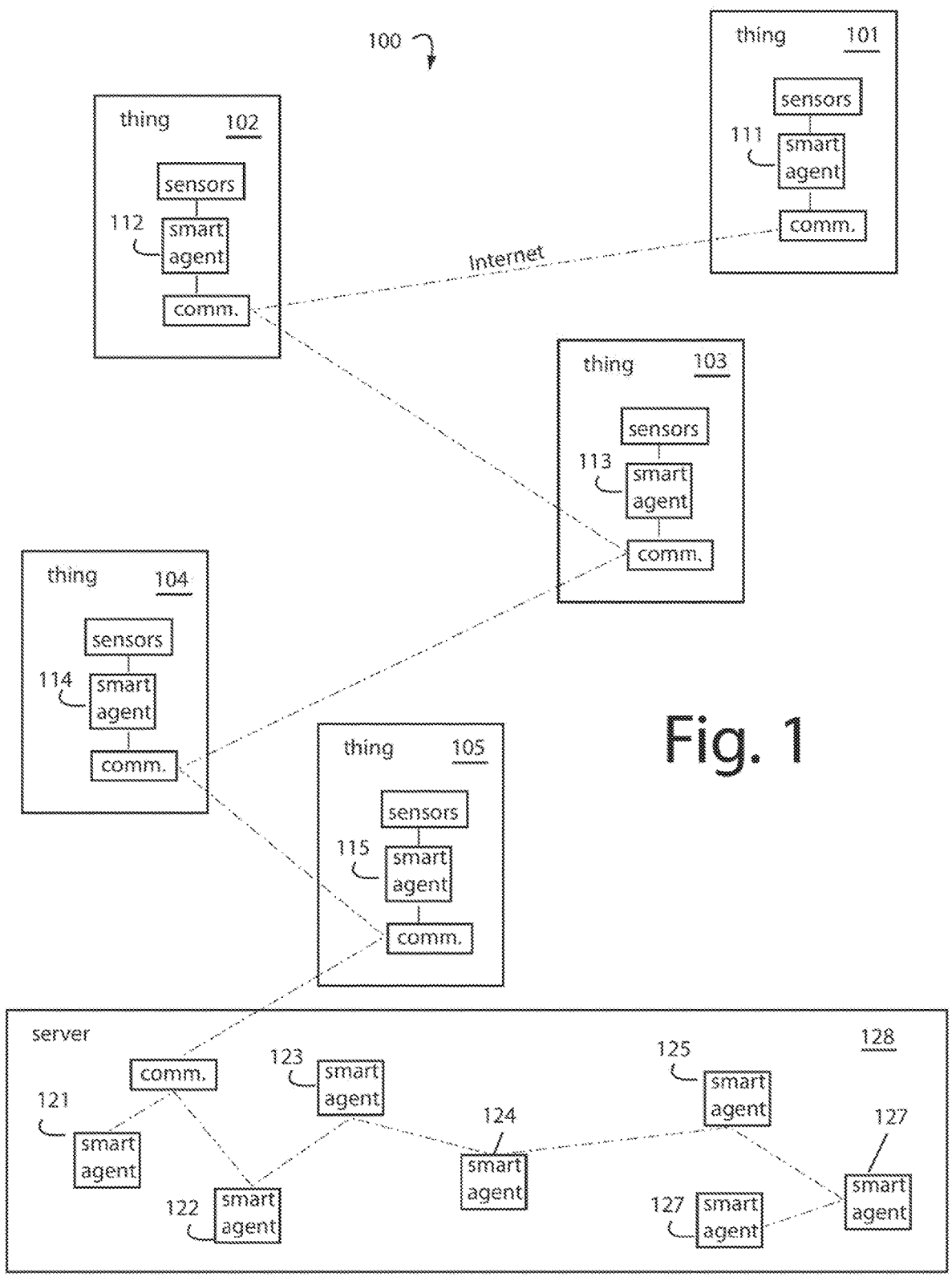
FIG. 1 is functional block diagram of an Internet-of-Things (IoT) embodiment of the present invention which assigned and attaches smart agents to the things and entities of interest.

Before describing the invention in detail, it is to be understood that the invention is not generally limited to specific electronic platforms or types of computing systems, as such may vary. It is also to be understood that the terminology used herein is intended to describe particular embodiments only, and is not intended to be limiting.

Furthermore, as used in this specification and the appended claims, the singular article forms "a," "an" and "the" include both singular and plural referents unless the context clearly dictates otherwise. Thus, for example, reference to "a smart agent" includes a plurality of smart agents as well as a single smart agent, reference to "a component" includes a single component as well as a collection of component, and the like.

In addition, the appended claims are to be interpreted as reciting subject matter that may take the form of a new and useful process machine, manufacture, and/or composition of matter, and/or any new and useful improvement thereof instead of an abstract idea.

In this specification and in the claims that follow, reference is made to a number of terms that are defined to have the following meanings, unless the context in which they are employed clearly indicates otherwise:

The terms "electronic," "electronically," and the like are used in their ordinary sense and relate to structures, e.g., semiconductor microstructures, that provide controlled conduction of electrons or other charge carriers, e.g., microstructures that allow for the controlled movement of holes or electrons in electron clouds.

The term "entity" is used herein in its ordinary sense and may refer to a construct or thing with distinct and independent existence, such as a human individual, a business, a corporation, a partnership, etc.

The term "internet" is used herein in its ordinary sense and refers to an interconnected system of networks that connects computers around the world via the TCP/IP and/or other protocols. Unless the context of its usage clearly indicates otherwise, the term "web" is generally used in a synonymous manner with the term "Internet."

The term "method" is used herein in a synonymous manner as the term "process" is used in 35 U.S.C. 101. Thus, both "methods" and "processes" described and claimed herein are patent eligible per 35 U.S.C. 101.

The term "smart agent" is used herein as a term of art to refer to specialized technology that differs from prior art technologies relating to bats or agents, e.g., used in searching information or used by social medial to keep track of birthday's systems or order pizzas. A "smart agent" described herein is an entity that is capable of having an effect on itself and its environment. It disposes of a partial representation of this environment. Its behavior is the outcome of its observations, knowledge and interactions with other smart agents. The smart agent technology described herein, rather than being pre-programed to try to anticipate every possible scenario or relying on pre-trained models, tracks and adaptively learns the specific behavior of every entity of interest over time. Thus, continuous one-to-one electronic behavioral analysis provides real-time actionable insights and/or warnings. In addition, smart agent technology described herein engages in adaptive learning that continually updates models to provide new intelligence. Furthermore, the smart agent technology solves technical problems associated with massive databases and/or data processing. Experimental data show about a one-millisecond response on entry-level computer servers. Such a speed is not achievable with prior art technologies. Additional differences between the smart agent technology claimed and prior so-called "smart agent" technology will be apparent upon review of the disclosure contained herein, The term "thing" is used in its ordinary sense and refers to a physical object, e.g., embedded with electronics, software, sensors, etc.

The terms "substantial" and "substantially" are used in their ordinary sense and are the antithesis of terms such as "trivial" and "inconsequential." For example, when the term "substantially" is used to refer to behavior that deviates from a reference normal behavior profile, the difference cannot constitute a mere trivial degree of deviation. The terms "substantial" and "substantially" are used analogously in other contexts involve an analogous definition.

Exemplary Embodiments of the Invention

FIG. 1 represents an Internet-of-things (IoT) embodiment of the present invention and is referred to herein by the general reference numeral 100. IoT 100 mechanizes, computerizes, automates, instruments, includes, and connects a broadly dispersed and extensively diverse universe of unrelated component "things" 101-105 to the Internet 108, e.g., credit cards, home appliances, industrial machinery, airplanes, cars, municipal water pumps, mobile devices, rain gauges, etc. Each thing 101-105 is assigned a resident local "smart agent" 111-115. Or an entity, manifesting remotely only as transaction records and reports, is assigned a virtual smart agent 121-127 in a server 128. These follow, track, record, chart, monitor, characterize, describe, render, and otherwise provide a label and handle on independent things and entities. Heretofore such things and entities ranged from unknown to unseen, to inaccessible, to forgotten, to unreachable, to uncontrollable, to inscrutable, to unreadable, to incomprehensible.

A "smart agent" by our definition resembles a data structure prearranged within a computer memory to epitomize an entity or thing in all its essentials by the entity's attributes, history, and behaviors that are manifest, e.g., from specifications, programming, sensors, and transaction data. Each smart agent allows an electronic rendering of the entity or thing it is consigned to in several different and selectable dimensions. Each smart agent 111-115 and 121-127 can be equipped with "action items" or a "job description" that boils down into clocking a series of steps in a finite state machine (FSM), given various conditions being present in its data, sensors, programming, or other data solicited from other smart agents. Such finite state machine can issue output signals and triggers in each step to other smart agents. The computer processor resources necessary to support such functionality are specially adapted to read/write the data structures in memory, run the finite state machines, provide the inputs, and generate the outputs. In the field, such computer processor resources can be a shared mobile device, an embedded microcomputer, or batch processor. A typical smartphone today represents all the sensor, processing, and communications hardware a typical smart agent 111-115 would need.

A smart agent can exist at some central location pooled with hundreds, thousands, or even millions of others that receive transaction records reporting the remote activities of the corresponding participants each is assigned to follow. For example, inside a network server they can intemperate and intercommunicate fairly freely and efficiently.

In the Internet-of-Things, the hundreds, thousands, or even millions of participants can be widely dispersed and are each assigned and equipped with a smart agent that is able to communicate with the others. Nowadays, that communication would rely on a wireless technology like WiFi, Bluetooth, NEC, GSM, 4G, etc. Some wireless technologies can breach long distances, others have the advantage of needing to be proximate or very close. That may help secure access to authorized (local) users in a very simple way hard to subvert.

Participants and entities in general are describable by their attributes. Even in widely diverse groups. In one sense, such participants and entities are nothing more than the sum of their attributes. Groups too. And attributes too are describable by their attributes. For example, if one attribute of an entity with a smart agent attached was the color blue, then a smart agent for "blue" could have as its attributes all the users who have the attribute blue. Another attribute could be a paint manufacturer's paint formula code for the blue. Accessing the blue smart agent would get you links immediately to every other smart agent describing itself as blue.

Attributes can be independently variable, fixed, or programmable. The operational status (on/off) of a device can be an independent variable reportable as an attribute. As are ambient temperature, noise, vibration, load, voltage, fuel level, service age. The model and serial number of a device can be a fixed attribute, as are assigned location, color, weight, specifications. A programmable attribute can be like start/stop, accelerate/decelerate, inflate/deflate, heat/cool.

Not all attributes need to be communicated. It may be safe or reasonable to assume or interpolate. For example, to limit communications bandwidth demands.

A piece of machinery can be a "thing" in the Internet-of-Things. Such could be equipped with appropriate sensors to measure ambient noise, temperature, load, output, energy consumption, vibration, etc. Measured and logged over time these attributes will usually fall into some routine or normal pattern of behavior. Smart agent profiles can be used to store and characterize what is normal for its "thing". Deviations from such normalcy can spell trouble, warn of impending failure, call for maintenance, signal intrusion, etc. The smart agent itself can be designed to take some kind of action, e.g., by communicating a "check machine" warning.

For a car, a location attribute would be an independent variable requiring a sensor like a GPS receiver. But for a utility power transformer, the location would normally be fixed. It could however be programmable, as in the case where a new utility power transformer is located in a warehouse inventory, then assigned to be installed on a utility pole, or has been removed to a hazardous waste site to have its toxic oil reserves removed. In this later case, the smart agent could be implemented within the utility power transformer, but would be better in a virtual location that always had power and communications to stay alive. Like an on-line dossier file.

The "thing" smart agents 111-115 can comprise attributes that have corresponding "attribute" smart agents among 121-127. Discovering or broadcasting to all "thing" smart agents 111-115 that share a particular attribute would be immediately and directly accessible and quantifiable by the particular "attribute" smart agent 121-127 within server 128. For example, if the attribute were "MasterCard", then all credit card entities or things 101-105 with that attribute would be immediately accessible. In another example, if the attribute were "California AKW 887", then any automobile "thing" 101-105 with that license plate attribute would be immediately accessible and available to be queried to report its GPS location.

In one embodiment of the present invention we described in U.S. patent application, SYSTEM ADMINISTRATOR BEHAVIOR ANALYSIS, Ser. No. 14/634,786, filed, Feb. 28, 2015, a smart-agent with case-based-reasoning (CBR) is virtually "attached" and assigned to every individual system admin, job, and task. Storage room for their respective profiles are maintained in secure memory inaccessible to the trusted system administrators being watched.

Figure 2:
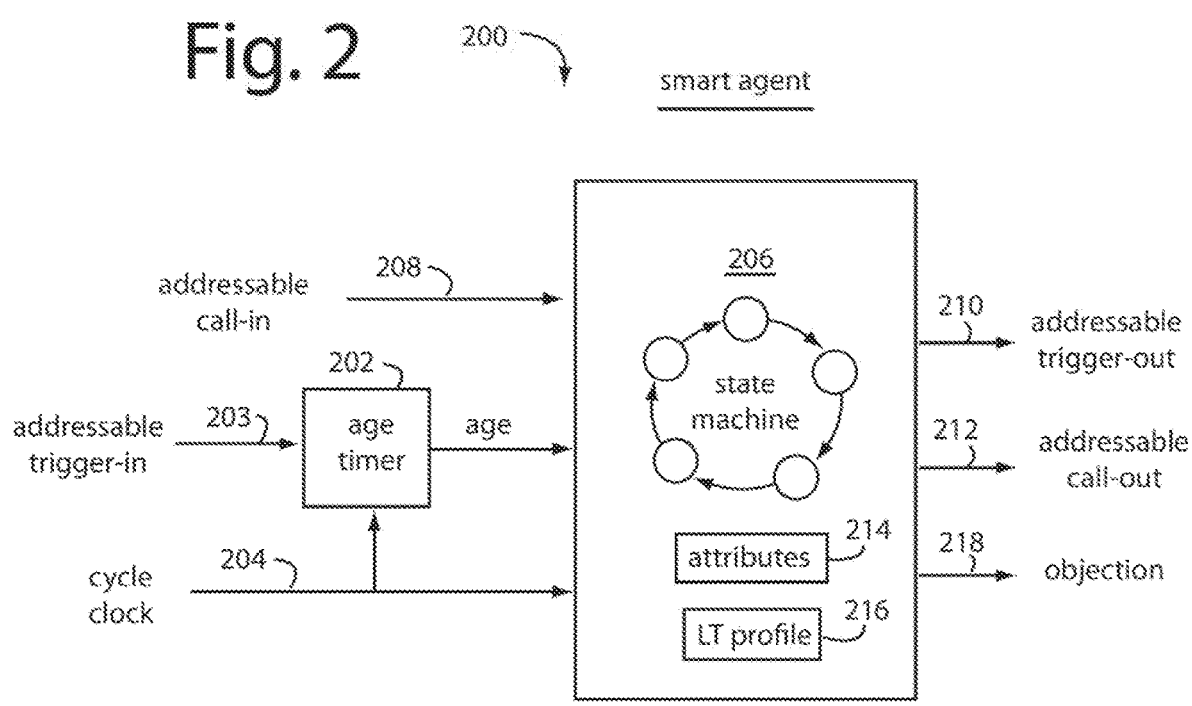
FIG. 2 is a functional block diagram of a smart-agent embodiment of the present invention could be useful in the IoT of FIG. 1.

Referring now to FIG. 2, each smart-agent 200 is addressable and has a timer 202 can be triggered into life with an addressable trigger-in 203 and begin aging tick-by-tick with a cycle clock 204. A state machine 206 can be addressably called into action like a "call" to a subroutine with an addressable call-in 208. An addressable trigger-out 210 can trigger into life other smart-agents. An addressable call-out 212 can call into action other smart-agents as if they were addressable subroutines. A list of attributes 214 describes, in an exemplary instance here, the particular tasks employed by this particular job, or the tasks that a particular system administrator can employ. A long term (LT) profile 216 is a memory log of the past activities that this smart-agent was involved in, and is able to develop a behavior profile of what is "normal" behavior for this entity.

An objection 218 can issue by the state machine 206 if the instant behavior for this entity seems abnormal, or if an age timeout 220 occurs before the state machine has run or finished in response to an addressable call-in 208.

Activity reports 220 are cleaned up, filtered for the particular smart-agent 200, and used to build LT profile 216. As each report comes in its information is inspected by state machine 206 to see if the activity was expected, normal, timely, respected priorities, etc. For example, if the activity was the running of a task.

Once an addressable call-in 208 is received, the state machine 206 will typically consult the attributes 214 to see what other addressable triggers-out 210 and addressable calls-out 212 should issue and in which clock cycles. For example, if a Job-A requires tasks t1-t7 to be run, then the Job-A smart-agent will trigger all seven of the T1-T7 smart-agents. If they timeout (age is too old) without having been employed in a call by the system admin, then the ones who weren't called into action will issue objections.

Here, an individual smart-agent 200 is spawned and attached to every identifiable system admin, job, and task. Each such smart-agent has its own characteristic attributes, e.g., a job smart-agent will have task attributes corresponding to every task that this particular job has called, should call, or should not call. The tasks it calls can have a priority order, and that would be another attribute and another smart-agent. The various smart-agents are interconnected, interrelated and each can be randomly accessed and consulted.

For example, any job smart-agent can have its LT profile 216 accessed to see who has called it, triggered it, it has called, it has triggered, etc. It can further be queried as to its attributes 214. It is therefore as easy to query what jobs have been done by which system administrators as it is to query which system administrators have done which jobs.

A CBR case consists of a problem, a previous solution that worked, and remarks about how the solution was derived. Case-based reasoning can be formalized as a four-step process:

| | |
|---|---|
| Retrieve | For each target problem, cases are retrieved from memory relevant to solving it. |
| Reuse | The solution is mapped from the previous case to the target problem and may involve adapting the solution to fit the new situation. |
| Revise | The new solution is tested and, if necessary, revised. |
| Retain | After a solution has been used successfully on the target problem, the resulting experience is stored as a new case in memory. |

Herein, a case comprises a system administrator's job task and the solutions comprise what particular system administrators did to do that job task. (There being many ways to solve a problem or do a job that will express the personalities involved.)

Figure 3:
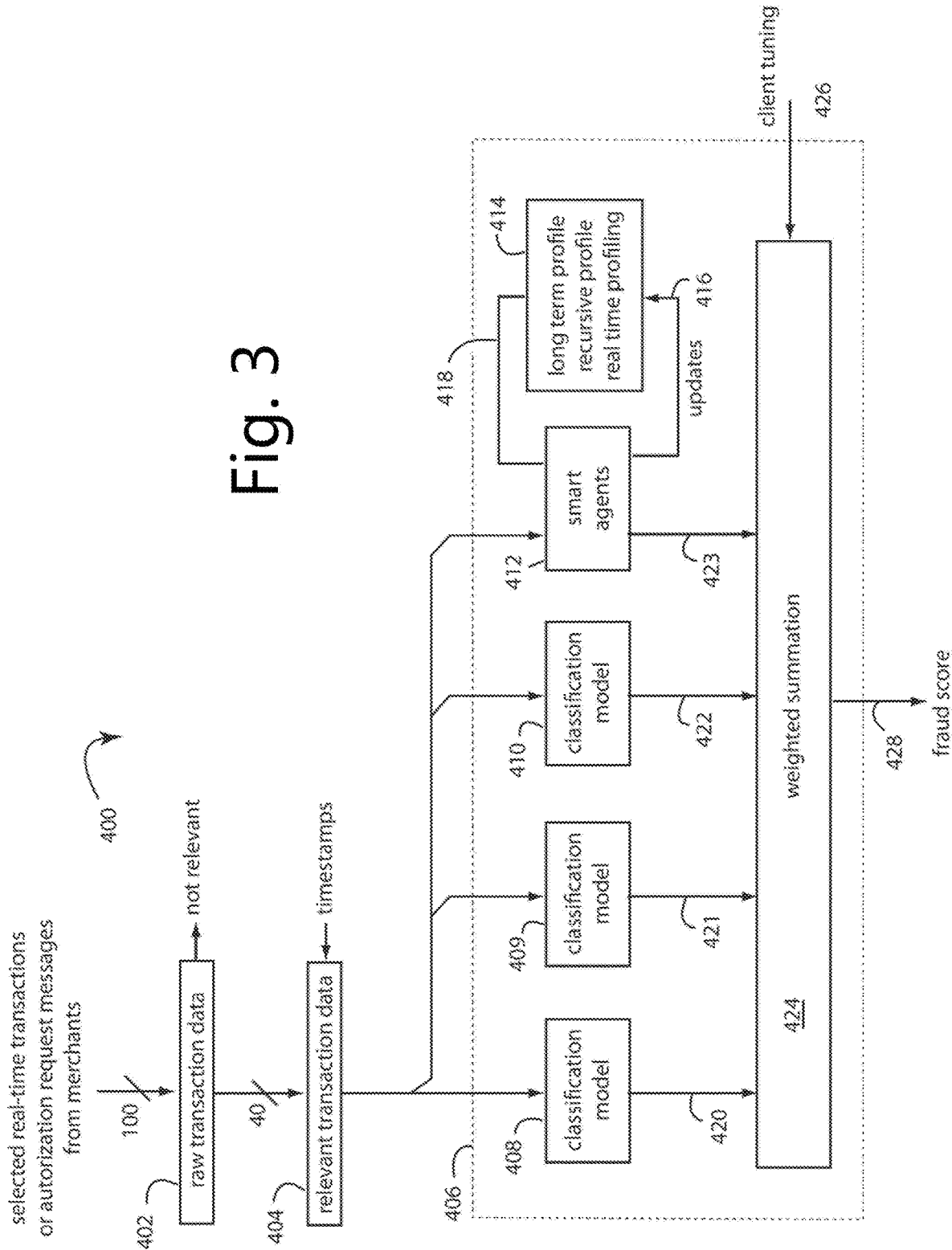
FIG. 3 is functional block diagram of a real-time payment fraud management system like that illustrated in FIG. 1 as applied payment fraud model.

FIG. 3 represents a real-time payment fraud management system 400 like that illustrated in FIG. 1 as applied payment fraud model 114. A raw transaction separator 402 filters through the forty or so data items that are relevant to the computing of a fraud score. A process 404 adds timestamps to these relevant data points and passes them in parallel to a selected applied fraud model 406. This is equivalent to applied payment fraud model 114 in FIG. 1.

During a session in which the time-stamped relevant transaction data flows in, a set of classification models 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided to the population of smart agents 412.

The classification models 408-410 and population of smart agents 412 and profilers 414 all each produce an independent and separate vote or fraud score 420-423 on the same line of time-stamped relevant transaction data. A weighted summation processor 424 responds to client tunings 426 to output a final fraud score 428.

The profiles associated with our Smart Agents enable them to automatically adapt without human intervention and without going off-line for retraining of the classification algorithms. And, neural networks are only one type of fraud classification used in parallel with Smart Agents to provide a vote that can be balanced and tuned by the user banks. Weighted Summation 424 FIG. 3. Our Smart Agents do not themselves include a neural network classification model. We also discovered that a single classification model is not enough, several different kinds in parallel are better at controlling fraud.

Figure 4:
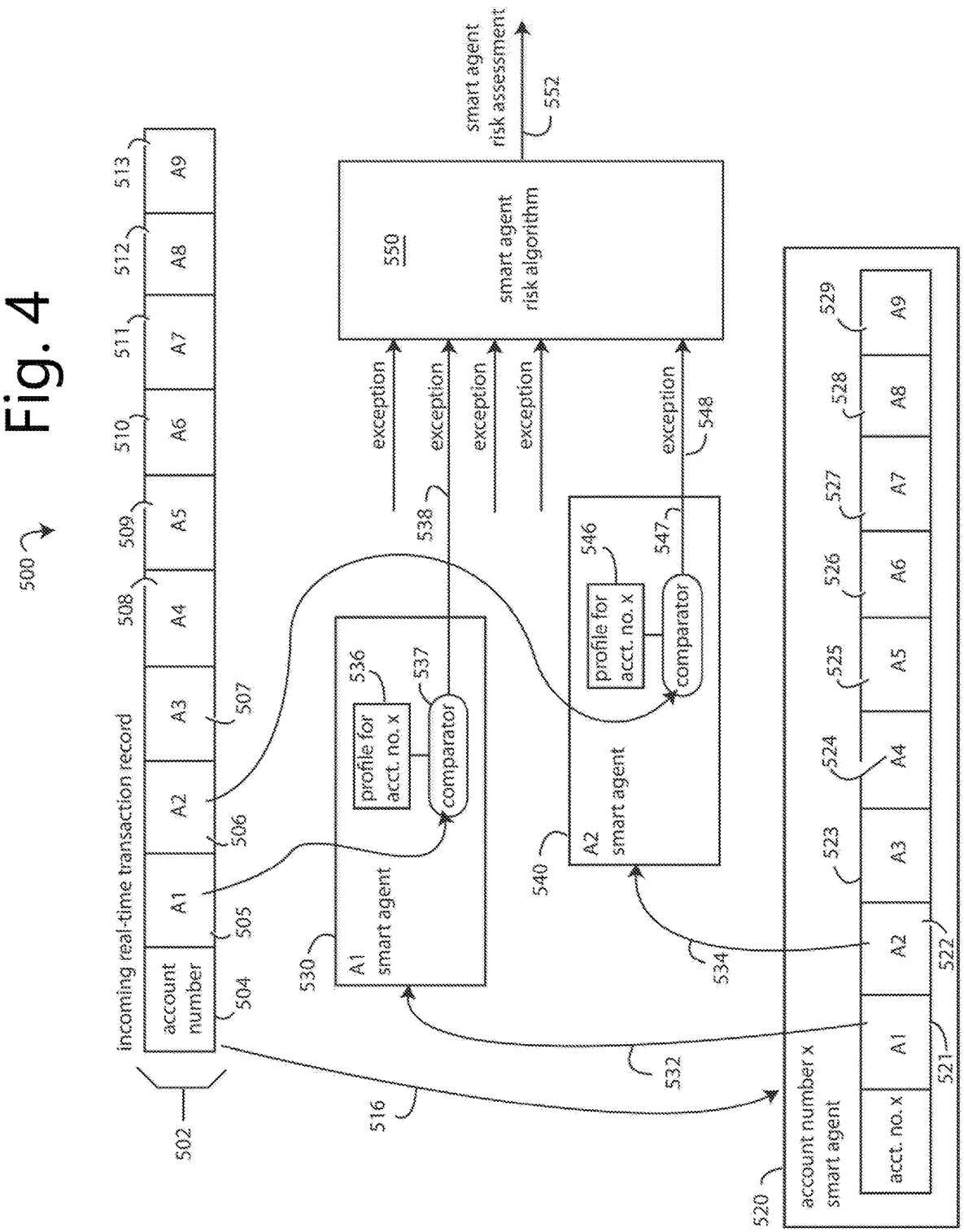
FIG. 4 is functional block diagram of a smart agent process embodiment of the present invention.

FIG. 4 represents a smart agent process 500 in an embodiment of the present invention. For example, these would include the smart agents 412 and profiles 414 in FIG. 3. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include data points for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A9 and numbered 521-529 in FIG. 4. These attributes A1-A9 521-529 are merely pointers to attribute smart agents. Two of these, one for A1 and one for A2, are represented in FIG. 4. Here, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 4 that would otherwise result.

Each attribute smart agent like 530 and 540 will include or access a corresponding profile data point 536 and 546. This is actually a simplification of three kinds of profiles that were originally built during training and updated in update 416 (FIG. 3). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Home Depot and Costco that average $100-$300, then an instantaneous incoming real-time transaction record 502 that reports another $200 purchase at the local Costco will raise no alarms. But a sudden, unique, inexplicable purchase for $1250 at a New York Jeweler will and should throw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 547 should accept some slack, but not too much. Each can throw an exception 538 and 548, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings 426 in FIG. 3.

These exceptions are collected by a smart agent risk algorithm 550. One deviation or exception thrown on any one attribute being "abnormal" can be tolerated if not too egregious. But two or more should be weighted more than just the simple sum, e.g., $(1+1)''=2''$ instead of simply $1+1=2$. The product is output as a smart agent risk assessment 552. This output is the equivalent of independent and separate vote or fraud score 423 in FIG. 3.

Figure 5:
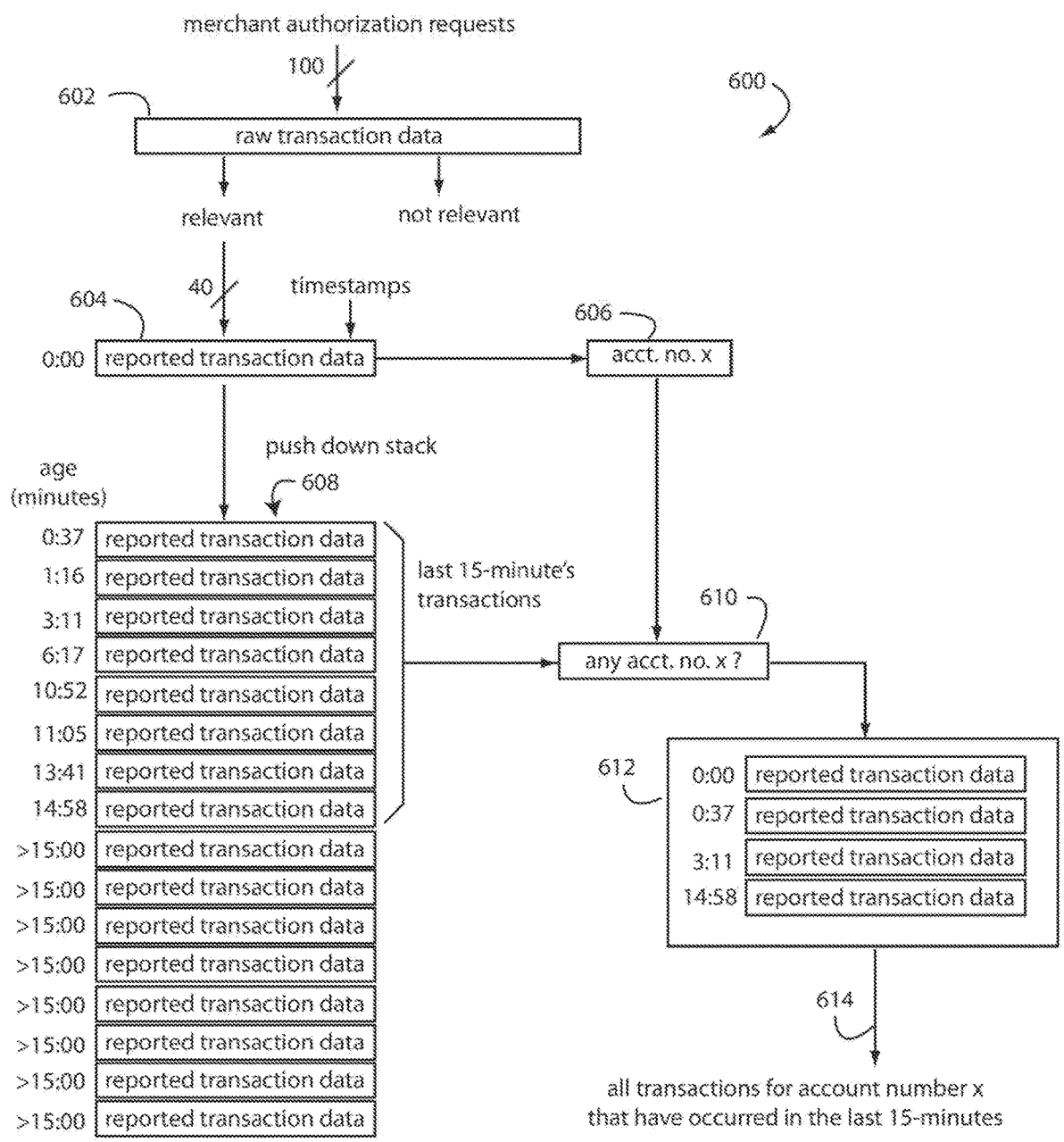
FIG. 5 is functional block diagram of a most recent fifteen-minute transaction velocity counter.

FIG. 5 represents a most recent 15-minute transaction velocity counter 600, in an embodiment of the present invention. It receives the same kind of real-time transaction data inputs as were described in connection with FIG. 3 as raw transaction data 402 and FIG. 4 as records 502. A raw transaction record 602 includes a hundred or so data points. About forty of those data points are relevant to fraud detection an identified in FIG. 5 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 5 arbitrarily identifies the respective ages of members of transaction time-series stack 608 with example ages 0:73, 1:16, 3:11, 6:17, 10:52, 11:05, 13:41, and 14:58. Those aged more than 15-minutes are simply identified with ages ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search process 610 accepts a search key from register 606 and reports any matches in the most 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 4.

Figure 6:
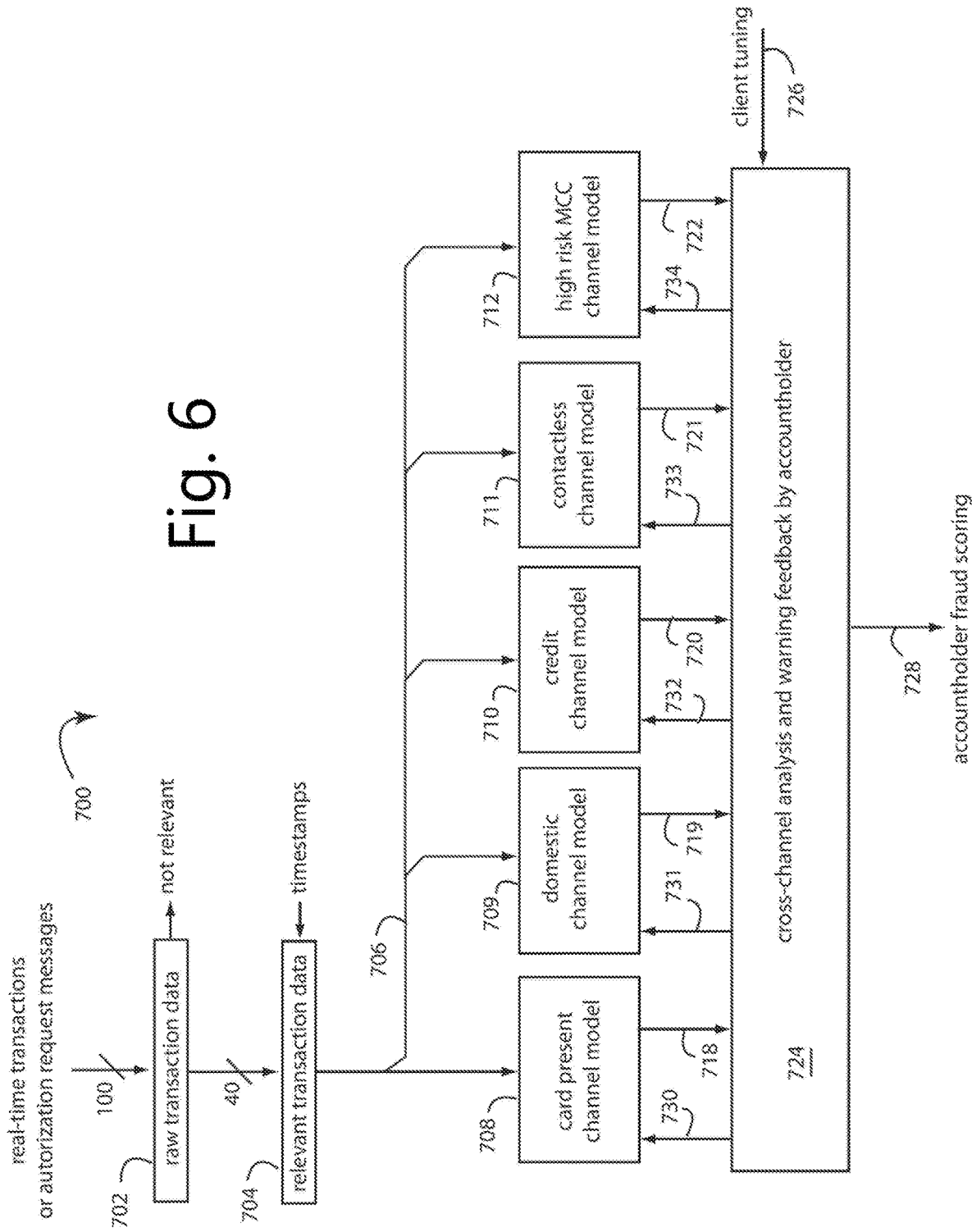
FIG. 6 is functional block diagram of a cross-channel payment fraud management embodiment of the present invention.

FIG. 6 represents a cross-channel payment fraud management embodiment of the present invention, and is referred to herein by general reference numeral 700.

Real-time cross-channel monitoring uses track cross channel and cross product patterns to cross pollinate information for more accurate decisions. Such track not only the channel where the fraud ends but also the initiating channel to deliver a holistic fraud monitoring. A standalone internet banking fraud solution will allow a transaction if it is within its limits, however if core banking is in picture, then it will stop this transaction, as we additionally know the source of funding of this account (which mostly in missing in internet banking).

a variety of selected applied fraud models MAY represent the applied fraud models 114 that result with different settings of A filter switch. A real-time cross-channel monitoring payment network server can be constructed by running several of these selected applied fraud models in parallel.

FIG. 6 represents a real-time cross-channel monitoring payment network server 700, in an embodiment of the present invention. Each customer or accountholder of a financial institution can have several very different kinds of accounts and use them in very different transactional channels. For example, card-present, domestic, credit card, contactless, and high risk MCC channels. So in order for a cross-channel fraud detection system to work at its best, all the transaction data from all the channels is funneled into one pipe for analysis.

Real-time transactions and authorization requests data is input and stripped of irrelevant datapoints by a process 702. The resulting relevant data is time-stamped in a process 704. The 15-minute vector process of FIG. 5 may be engaged at this point in background. A bus 706 feeds the data in parallel line-by-line, e.g., to a selected applied fraud channel model for card present 708, domestic 709, credit 710, contactless 711, and high risk MCC 712. Each can pop an exception to the current line input data with an evaluation flag or score 718-722. The involved accountholder is understood.

These exceptions are collected and analyzed by a process 724 that can issue warning feedback for the profiles maintained for each accountholder. Each selected applied fraud channel model 708-712 shares risk information about particular accountholders with the other selected applied fraud models 708-712. A suspicious or outright fraudulent transaction detected by a first selected applied fraud channel model 708-712 for a particular customer in one channel is cause for a risk adjustment for that same customer in all the other applied fraud models for the other channels.

Exceptions 718-722 to an instant transactions on bus 706 trigger an automated examination of the customer or accountholder involved in a profiling process 724, especially with respect to the 15-minute vectors and activity in the other channels for the instant accountholder. A client tuning input 726 will affect an ultimate accountholder fraud scoring output 728, e.g., by changing the respective risk thresholds for genuine-suspicious-fraudulent.

A corresponding set of warning triggers 73-734 is fed back to all the applied fraud channel models 708-712. The compromised accountholder result 728 can be expected to be a highly accurate and early protection warning.

In general, a process for cross-channel financial fraud protection comprises training a variety of real-time, risk-scoring fraud models with training data selected for each from a common transaction history to specialize each member in the monitoring of a selected channel. Then arranging the variety of real-time, risk-scoring fraud models after the training into a parallel arrangement so that all receive a mixed channel flow of real-time transaction data or authorization requests. The parallel arrangement of diversity trained real-time, risk-scoring fraud models is hosted on a network server platform for real-time risk scoring of the mixed channel flow of real-time transaction data or authorization requests. Risk thresholds are immediately updated for particular accountholders in every member of the parallel arrangement of diversity trained real-time, risk-scoring fraud models when any one of them detects a suspicious or outright fraudulent transaction data or authorization request for the accountholder. So, a compromise, takeover, or suspicious activity of the accountholder's account in any one channel is thereafter prevented from being employed to perpetrate a fraud in any of the other channels.

Such process for cross-channel financial fraud protection can further comprise steps for building a population of real-time and a long-term and a recursive profile for each the accountholder in each the real-time, risk-scoring fraud models. Then during real-time use, maintaining and updating the real-time, long-term, and recursive profiles for each accountholder in each and all of the real-time, risk-scoring fraud models with newly arriving data. If during real-time use a compromise, takeover, or suspicious activity of the accountholder's account in any one channel is detected, then updating the real-time, long-term, and recursive profiles for each accountholder in each and all of the other real-time, risk-scoring fraud models to further include an elevated risk flag. The elevated risk flags are included in a final risk score calculation 728 for the current transaction or authorization request.

The 15-minute vectors described in FIG. 5 are a way to cross pollenate risks calculated in one channel with the others. The 15-minute vectors can represent an amalgamation of transactions in all channels, or channel-by channel. Once a 15-minute vector has aged, it can be shifted into a 30-minute vector, a one-hour vector, and a whole day vector by a simple shift register means. These vectors represent velocity counts that can be very effective in catching fraud as it is occurring in real time.

In every case, embodiments of the present invention include adaptive learning that combines three learning techniques to evolve the artificial intelligence classifiers, e.g., 408-414. First is the automatic creation of profiles, or smart-agents, from historical data, e.g., long-term profiling. The second is real-time learning, e.g., enrichment of the smart-agents based on real-time activities. See FIG. 3. The third is adaptive learning carried by incremental learning algorithms. See FIG. 6.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code(MCC), time, amount for an mcc over a period of time, recursive profiling, zip codes, type of merchant, monthly aggregation, activity during the week, weekend, holidays, Card not present (CNP) versus card present (CP), domestic versus cross-border, etc. this profile will highlights all the normal activities of the smart-agent (specific card).

Smart-agent technology has been observed to outperform conventional artificial and machine learning technologies. For example, data mining technology creates a decision tree from historical data: When historical data is applied to data mining algorithms, the result is a decision tree. Decision tree logic can be used to detect fraud in credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which requires actual business experts to write the rules, e.g., if-then-else logic. The most important limitations here are that the business rules require writing rules that are supposed to work for whole categories of customers. This requires the population to be sliced into many categories (students, seniors, zip codes, etc.) and asks the experts to provide rules that apply to all the cardholders of a category.

How could the US population be sliced? Even worse, why would all the cardholders in a category all have the same behavior? It is plain that business rules logic has built-in limits, and poor detection rates with high false positives. What should also be obvious is the rules are outdated as soon as they are written because conventionally they don't adapt at all to new fraud schemes or data shifts.

Neural network technology also limits, it uses historical data to create a matrix weights for future data classification. The Neural network will use as input (first layer) the historical transactions and the classification for fraud or not as an output). Neural Networks only learn from past transactions and cannot detect any new fraud schemes (that arise daily)) if the neural network was not re-trained with this type of fraud. Same as data mining and business rules the classification logic learned from the historical data will be applied to all the cardholders even though each merchant has a unique activity pattern and each cardholder has a unique spending pattern.

Another limit is the classification logic learned from historical data is outdated the same day of its use because the fraud schemes changes but since the neural network did not learn with examples that contain this new type of fraud schemes, it will fail to detect this new type of fraud it lacks the ability to adapt to new fraud schemes and do not have the ability to respond to the highly volatile nature of fraud.

Contrary to previous technologies, smart-agent technology learns the specific behaviors of each cardholder and create a smart-agent that follow the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say twenty-seven terabytes of historical data is transformed into smart-agents, only 200-gigabytes is needed to represent twenty-seven million distinct smart-agents corresponding to all the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

In real-time behavioral profiling by the smart-agents, both the real-time and long-term engines require high speed transfers and lots of processor attention. Conventional database systems cannot provide the transfer speeds necessary, and the processing burdens cannot be tolerated.

Embodiments of the present invention include a fast, low overhead, custom file format and storage engine designed to retrieve profiles in real-time with a constant low load and save time. For example, the long-term, recursive, and real-time profiles 414 in FIG. 3, Referring now to FIG. 7, a group of smart agent profiles is stored in a custom binary file 800 which starts with a meta-data section 802 containing a profile definition, and a number of fixed size profile blocks, e.g., 804, 805, . . . 806 each containing the respective profiles. Such profiles are individually reserved to and used by a corresponding smart agent, e.g., profile 536 and smart agent 530 in FIG. 4. Fast file access to the profiles is needed on the arrival of every transaction 502. In FIG. 4, account number 504 signals the particular smart agents and profiles to access and that are required to provide a smart agent risk assessment 552 in real-time. For example, an approval or a denial in response to an authorization request message.

FIG. 9 represents what's inside each such profile, e.g., a profile 900 includes a meta-data 902 and a rolling list of vectors 904. The meta-data 902 comprises the oldest one's time field 906, and a record length field 908. Transaction events are timestamped, recorded, and indexed by a specified atomic interval, e.g., ten minute intervals are typical, which is six hundred seconds. Each vector points to a run of profile datapoints that all share the same time interval, e.g., intervals 910-912. Some intervals will have no events, and therefor no vectors 904. Here, all the time intervals less than ninety days old are considered by the real-time (RT) profiles. Ones older than that are amalgamated into the respective long-term (LT) profiles.

What was purchased and how long ago a transaction for a particular accountholder occurred, and when their other recent transactions occurred can provide valuable insights into whether the transactions the accountholder is presently engaging in are normal and in character, or deviating. Forcing a fraud management and protection system to hunt a conventional database for every transaction a particular random accountholder engaged in is not practical. The accountholders' transactions must be pre-organized into their respective profiles so they are always randomly available for instant calculations. How that is made possible in embodiments of the present invention is illustrated here in FIGS. 5, 6, and 8-10.

FIG. 9 illustrates a virtual memory system 1000 in which a virtual address representation 1002 is translated into a physical memory address 1004, and/or a disk block address 1006.

Profiling herein looks at events that occurred over a specific span of time. Any vectors that were assigned to events older than that are retired and made available for re-assignment to new events as they are added to the beginning of the list.

The following pseudo-code examples represent how smart agents (e.g., 412, 550) lookup profiles and make behavior deviation computations. A first step when a new transaction (e.g., 502) arrives is to find the one profile it should be directed to in the memory or filing system.

```
find_profile ( T: transaction, PT : Profile's Type )
Begin
    Extract the value from T for each key used in the routing logic for PT
    Combine the values from each key into PK
    Search for PK in the in-memory index
    If found, load the profile in the file of type PT based on the indexed
    position.
```

-continued

```
    Else, this is a new element without a profile of type PT yet.
End
```

If the profile is not a new one, then it can be updated, otherwise a new one has to be created.

```
update_profile ( T: transaction, PT : Profile's Type )
Begin
    find_profile of type PT P associated to T
    Deduce the timestamp t associated to T
    If P is empty, then add a new record based on the atomic interval for
    t
    Else locate the record to update based on t
        If there is no record associated to t yet,
            Then add a new record based on the atomic interval for t
        For each datapoint in the profile, update the record with the values in
        T (by increasing a count, sum, deducing a new minimum, maximum
        ...).
    Save the update to disk
End
compute_profile ( T: transaction, PT : Profile's Type )
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DR
            Then update C with the value of DB in the record R (by
            increasing a count, sum,
                deducing a new minimum, maximum ...)
        End For
    End For
    Return the values for each counter C
End
compute_profile ( T: transaction, PT : Profile's Type )
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DR
            Then update C with the value of DB in the record R (by
            increasing a count, sum,
                deducing a new minimum, maximum ...)
        End For
    End For
    Return the values for each counter C
End
```

The entity's behavior in the instant transaction is then analyzed to determine if the real-time (RT) behavior is out of the norm defined in the corresponding long-term (LT) profile. If a threshold (T) is exceeded, the transaction risk score is incremented.

```
analyze_entity_behavior ( T: transaction )
Begin
    Get the real-time profile RT by calling compute_profile( T,
    real-time )
    Get the long-term profile LT by calling compute_profile( T,
    long-term )
    Analyze the behavior of the entity by comparing its current behavior
    RT to its past behavior LT:
    For each datapoint DP in the profile,
        Compare the current value in RT to the one in LT (by computing
        the ratio or distance between the values).
            If the ratio or distance is greater than the pre-defined threshold,
            Then increase the risk associated to the transaction T
            Else decrease the risk associated to the transaction T
        End For
```

```
Return the global risk associated to the transaction T
End
```

The entity's behavior in the instant transaction can further be analyzed to determine if its real-time (RT) behavior is out of the norm compared to its peer groups. defined in the corresponding long-term (LT) profile, if a threshold (T) is exceeded, the transaction risk score is incremented.

Recursive profiling compares the transaction (T) to the entity's peers one at a time.

```
compare_entity_to_peers ( T: transaction )
Begin
    Get the real-time profile RTe by calling compute_profile( T,
    real-time )
    Get the long-term profile LTe by calling compute_profile( T,
    long-term )
    Analyze the behavior of the entity by comparing it to its peer groups:
    For each peer group associated to the entity
        Get the real-time profile RTp of the peer: compute_profile( T,
        real-time )
        Get the long-term profile LTp of the peer: compute_profile( T,
        long-term )
        For each datapoint DP in the profile,
        Compare the current value in RTe and LTe to the ones in RTp and
        LTp (by computing the ratio or distance between the values).
            If the ratio or distance is greater than the pre-defined threshold,
            Then increase the risk associated to the transaction T
            Else decrease the risk associated to the transaction T
        End For
    End For
    Return the global risk associated to the transaction T
End
```

Each attribute inspection will either increase or decrease the associated overall transaction risk. For example, a transaction with a zipcode that is highly represented in the long term profile would reduce risk. A transaction amount in line with prior experiences would also be a reason to reduce risk. But an MCC datapont that has never been seen before for this entity represents a high risk. (Unless it could be forecast or otherwise predicted.)

One or more datapoints in a transaction can be expanded with a velocity count of how-many or how-much of the corresponding attributes have occurred over at least one different span of time intervals. The velocity counts are included in a calculation of the transaction risk.

Transaction risk is calculated datapoint-by-datapoint and includes velocity count expansions. The datapoint values that exceed a normative point by a threshold value increment the transaction risk. Datapoint values that do not exceed the threshold value cause the transaction risk to be decremented. A positive or negative bias value can be added that effectively shifts the threshold values to sensitize or desensitize a particular datapoint for subsequent transactions related to the same entity. For example, when an airline expense is certain to be followed by a rental car or hotel expense in a far away city. The MCC's for rental car and hotel expenses are desensitized, as are datapoints for merchant locations in a corresponding far away city.

Figure 10:
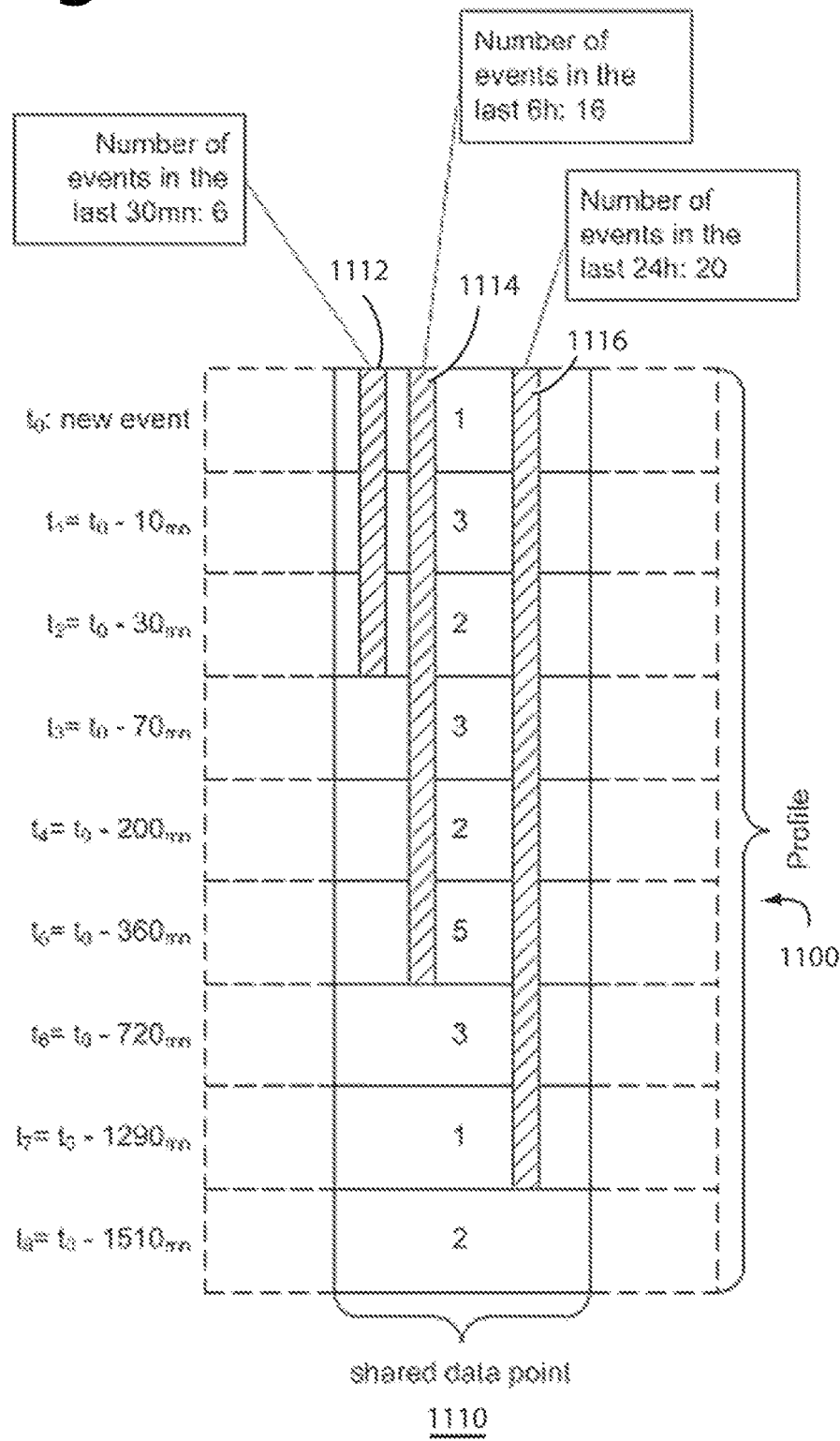
FIG. 10 is a diagram of a small part of an exemplary smart agent profile that spans several time intervals.

FIG. 10 illustrates an example of a profile 1100 that spans a number of time intervals $t_0$ to $t_8$. Transactions, and therefore profiles normally have dozens of datapoints that either come directly from each transaction or that are computed from transactions for a single entity over a series of time intervals. A typical datapoint 1110 velocity counts the number of events that have occurred in the last thirty minutes (count 1112), the last six hours (count 1114), and the last twenty-four hours (count 1116). In this example, $t_0$ had one event, t1 had 3 events, $t_2$ had 2 events, $t_3$ had 3 events, $t_4$ had 2 events, $t_5$ had 5 events, $t_6$ had 3 events, $t_7$ had one event, and $t_8$ had 2 events; therefore, $t_2$ count 1112=6, $t_5$ count 1114=16, and $t_7$ count 1116=20. These three counts, 1112-1116 provide their velocity count computations in a simple and quick-to-fetch summation.

Figure 11:
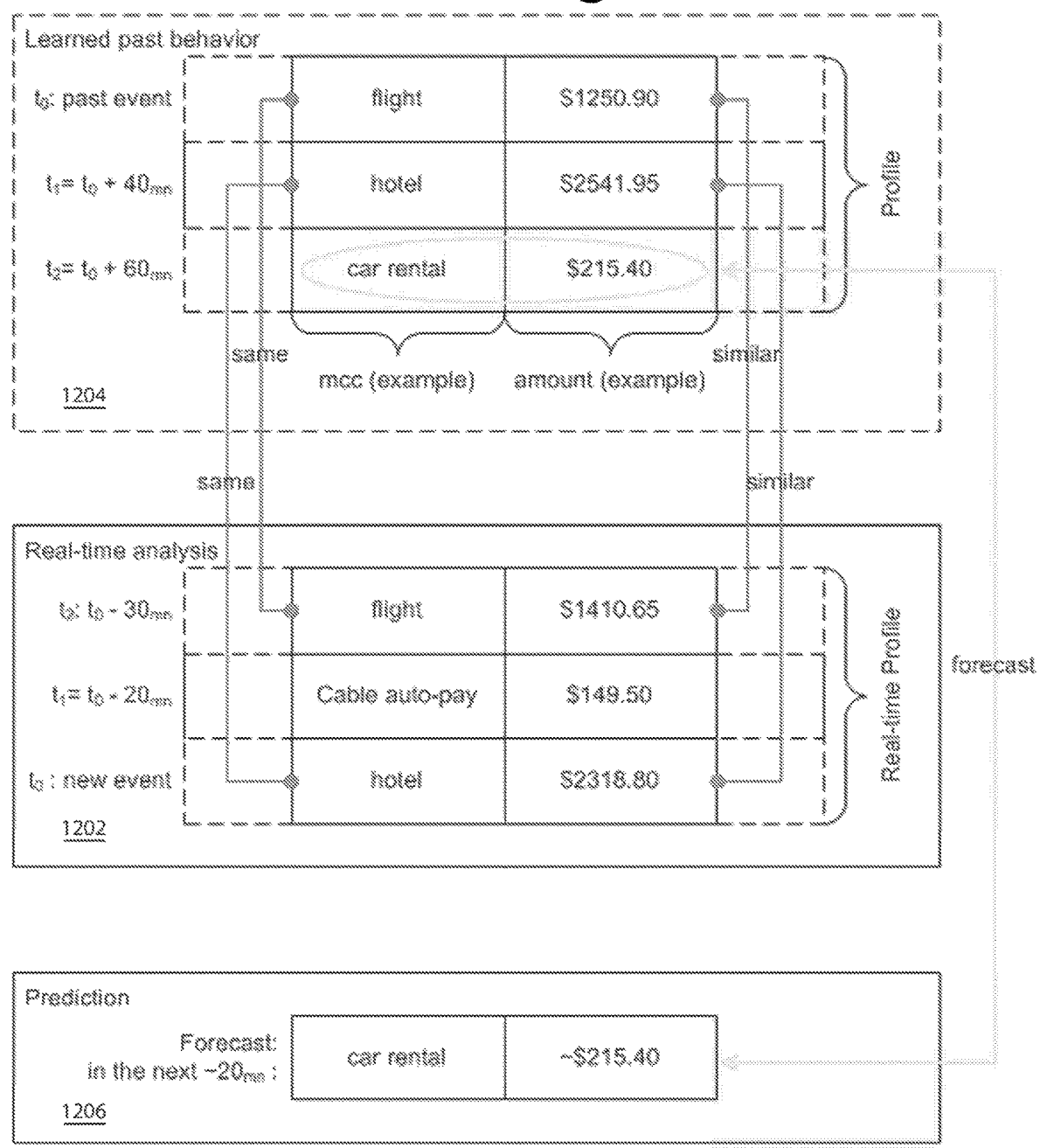
FIG. 11 is a diagram of a behavioral forecasting aspect of the present invention.

FIG. 11 illustrates a behavioral forecasting aspect of the present invention. A forecast model 1200 engages in a real-time analysis 1202, consults a learned past behavior 1204, and then makes a behavioral prediction 1206. For example, the real-time analysis 1202 includes a flight purchase for $1410.65, an auto pay for cable for $149.50, and a hotel for $2318.80 in a most recent event. It makes sense that the booking and payment for a flight would be concomitant with a hotel expense, both represent travel. Consulting the learned past behavior 1204 reveals that transactions for flights and hotels has also been accompanied by a car rental. So an easy forecast for a car rental in the near future is and easy and reasonable assumption to make in behavioral prediction 1206.

Figure 12:
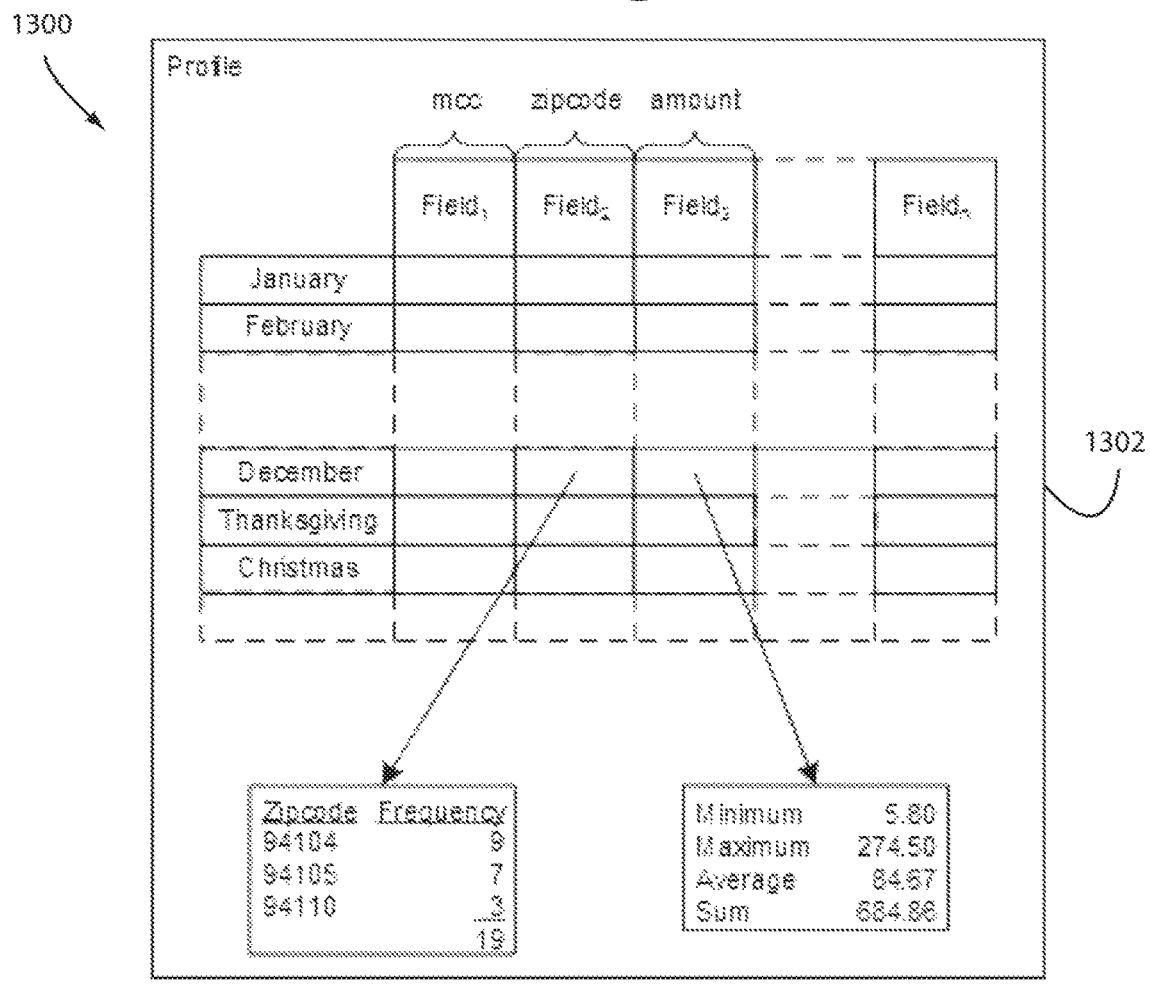
FIG. 12 is a diagram representing a simplified smart agent profile and how individual constituent datapoints are compared to running norms and are accumulated into an overall risk score.

Normally, an out-of-character expense for a car rental would carry a certain base level of risk. But if it can be forecast one is coming, and it arrives, then the risk can reduced since it has been forecast and is expected. Embodiments of the present invention therefore temporarily reduce risk assessments in the future transactions whenever particular classes and categories of expenses can be predicted or forecast, In another example, a transaction to pay tuition at a local college could be expected to result in related expenses. So forecasts for bookstore purchases and ATM cash withdrawals at the college are reasonable. The bottom-line is fewer false positives will result, FIG. 12 illustrates a forecasting example 1300. A smart agent profile 1302 has several datapoint fields, field 1 through field n. Here we assume the first three datapoint fields are for the MCC, zipcode, and amount reported in a new transaction. Several transaction time intervals spanning the calendar year include the months of January . . . December, and the Thanksgiving and Christmas seasons. In forecasting example 1300 the occurrence of certain zip codes is nine for 94104, seven for 94105, and three for 94110, Transaction amounts range $5.80 to $274.50 with an average of $84.67 and a running total of $684.86, A first transaction risk example 1304 is timestamped Dec. 5, 2013 and was for an unknown grocery store in a known zipcode and for the average amount. The risk score is thus plus, minus, minus for an overall low-risk.

A second transaction risk example 1306 is also timestamped Dec. 5, 2013 and was for a known grocery store in an unknown zipcode and for about the average amount. The risk score is thus minus, plus, minus for an overall low-risk.

A third transaction risk example 1306 is timestamped Dec. 5, 2013, and was for an airline flight in an unknown, far away zipcode and for almost three times the previous maximum amount. The risk score is thus triple plus for an overall high-risk. But before the transaction is flagged as suspicious or fraudulent, other datapoints can be scrutinized.

Each datapoint field can be given a different weight n the computation in an overall risk score.

In a forecasting embodiment of the present invention, each datapoint field can be loaded during an earlier time interval with a positive or negative bias to either sensitize or desensitize the category to transactions affecting particular datapoint fields in later time intervals. The bias can be permanent, temporary, or decaying to none.

For example, if a customer calls in and gives a heads up they are going to be traveling next month in France, then location datapoint fields that detect locations in France in next month's time intervals can be desensitized so that alone does not trigger a higher risk score. (And maybe a "declined" response.)

Some transactions alone herald other similar or related ones will follow in a time cluster, location cluster, and/or in an MCC category like travel, do-it-yourself, moving, and even maternity. Still other transactions that time cluster, location cluster, and/or share a category are likely to reoccur in the future. So a historical record can provide insights and comfort.

Figure 13:
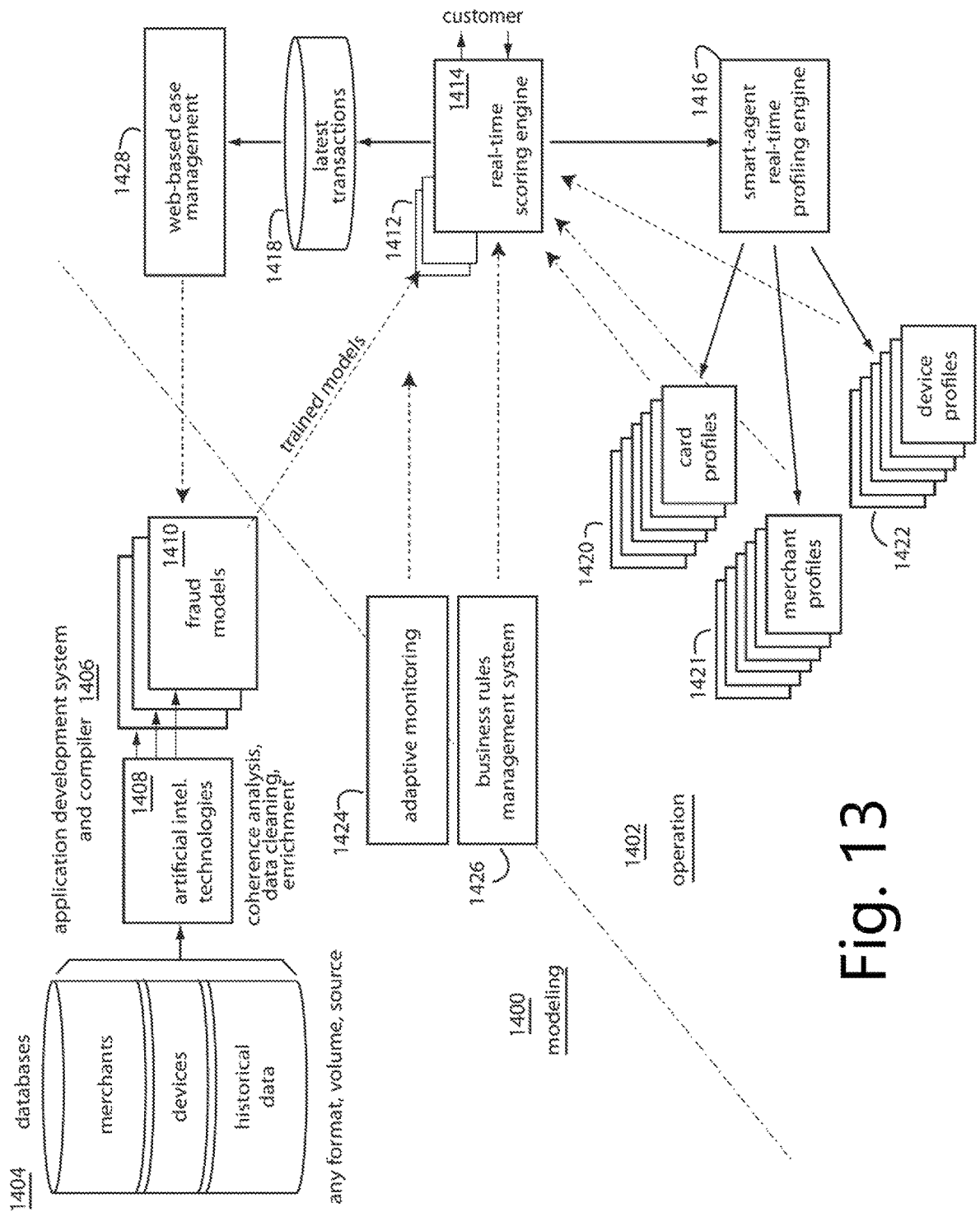
FIG. 13 is a functional block diagram of a modeling and operational environment in which an application development system is used initially to generate, launch, and run millions of smart agents and their profiles.

FIG. 13 represents the development, modeling, and operational aspects of a single-platform risk and compliance embodiment of the present invention that depends on millions of smart agents and their corresponding behavioral profiles. It represents an example of how user device identification (Device ID) and profiling is allied with accountholder profiling and merchant profiling to provide a three-dimensional examination of the behaviors in the penumbra of every transaction and authorization request. The development and modeling aspects are referred to herein by the general reference numeral 1400. The operational aspects are referred to herein by the general reference numeral 1402. In other words, compile-time and run-tine.

The intended customers of embodiments of the present invention are financial institutions who suffer attempts by fraudsters at payment transaction fraud and need fully automated real-time protection. Such customers provide the full database dossiers 1404 that they keep on their authorized merchants, the user devices employed by their accountholders, and historical transaction data. Such data is required to be accommodated in any format, volume, or source by an application development system and compiler (ADSC) 1406. ADSC 1406 assists expert programmers to use a dozen artificial intelligence and classification technologies 1408 they incorporate into a variety of fraud models 1410. This process is more fully described in U.S. patent application Ser. No. 14/514,381, filed Oct. 15, 2014 and titled, ARTIFICIAL INTELLIGENCE FRAUD MANAGEMENT SOLUTION. Such is fully incorporated herein by reference.

One or more trained fraud models 1412 are delivered as a commercial product or service to a single platform risk and compliance server with a real-time scoring engine 1414 for real-time multi-layered risk management. In one perspective, trained models 1412 can be viewed as efficient and compact distillations of databases 1404, e.g., a 100:1 reduction. These distillations are easier to store, deploy, and afford.

During operation, real-time scoring engine 1414 provides device ID and clickstream analytics, real-time smart agent profiling, link analysis and peer comparison for merchant/internal fraud detection, real-time cross-channel fraud prevention, real-time data breach detection and identification device ID and clickstream profiling for network/device protection.

A real-time smart agent profiling engine 1416 receives behavioral digests of the latest transactions 1418 and uses them to update three populations of profiles 1420-1422. Specifically, a population of card profiles 1420, a population of merchant profiles 1421, and a population of device profiles 1422 all originally generated by ADSC 1406 and included in the trained models 1412. These are all randomly and individually consulted in real-time by smart agent profiling engine 1416 to understand what is "normal" for a particular card, merchant, and user device.

Real-time smart agent profiling engine 1416 accepts customer transaction data and scores each line. Such scores are in accordance with business rules provided by a business rules management system (BRMS) 1424 and any adaptive updates 1426 needed to the original set of models 1410 produced by artificial intelligence technologies and classifiers 1408. A web-based case management system 1428 uses false positives and false negatives to tighten up models 1410. These are periodically used to remotely update models 1412.

In general smart agent process embodiments of the present invention generate a population of smart agent profiles by data mining of historical transaction data. A corresponding number of entities responsible for each transaction are sorted and each are paired with a newly minted smart agent profile. Each smart agent profile so generated is modelled to collect and list individual and expanded attributes of said transactions in one column dimension and by time interval series in another row dimension. Each smart agent profile is stored in a file access system of a network server platform.

Each newly arriving transaction record is compared and contrasted attribute-by-attribute with the time interval series of attributes archived in its paired smart agent profile, and each such comparison and contrast incrementally increases or decreases a computed fraud risk score. The computed fraud risk score is thereafter output as a determination of whether the newly arriving transaction record represents a genuine transaction, a suspicious transaction, or a fraudulent transaction. Or maybe just OK-bad, or a fuzzy score between 0 . . . 1.

Each time interval series can be partitioned or divided in its row dimension into a real-time part and a long-term part to separately pre-compute from the real-time part and the long-term part a velocity count and statistics of said individual and expanded attributes. The newly arriving transaction record is then compared item-by-item to relevant items in each said real-time part and long-term part, and thereby determines if each item represents known behavior or unknown behavior.

Each newly arriving transaction record is inspected to see if the entity it represents has not yet been paired to a smart agent profile, and if not then generating and pairing a newly minted smart agent profile for it.

In another embodiment, three populations of smart agent profiles are generated by data mining the historical transaction data. A corresponding number of cardholder, merchant, and identified device entities involved in each transaction are sorted and each are paired with a newly minted smart agent profile. Then, each newly arriving transaction record is compared and contrasted attribute-by-attribute with the time interval series of attributes archived in the smart agent profiles paired with the particular cardholder, and with the particular merchant, and with the particular identified device (Device ID), and each such comparison and contrast incrementally increases or decreases a computed overall fraud risk score. See our U.S. patent application Ser. No. 14517863, filed Oct. 19, 2014, and titled User Device Profiling In Transaction Authentications, for details on the Device ID technology we have in mind here.

The entity Smart Agents herein are data structures used to store attributes which describe the entity it follows with links to attribute Smart Agents whose attributes are the identities of the other Smart Agents that invoke them. For example, a single healthcare provider would be assigned an entity Smart Agent that lists that provider's attributes, e.g., medical qualifications, medical specialty, medical office facility, organization size, etc. Each of those attributes has its own Smart Agent accessible via a link. Some attributes do not change, some change slowly, some signal risk if changed, some change daily, and some, like short term and long term profiles are histories that can be compartmented into the last minute, the last hour, the last day, the last week, the last month, and the last year. The attribute Smart Agents link back to the entity Smart Agents that are described by them.

For example, the attribute Smart Agent for medical specialty will link back to all the entity Smart Agents with the medical specialty. This would help cross check one healthcare provider with another that shared the same medical specialty, medical office facility, organization size, etc. E.g., peer groups by selectable, single dimensions.

Variations of the present invention will be apparent to those of ordinary skill in the art in view of the disclosure contained herein. For example, specialized tools and modules, e.g., in the form of software, computer programs, or circuitry, may be developed to allow programmers and administrators to set up systems and processes or methods in accordance with the invention.

In any case, it should be noted that any particular embodiment of the invention may be modified to include or exclude features of other embodiments as appropriate without departing from the spirit of the invention. It is also believed that principles such as "economies of scale" and "network effects" are applicable to the invention and that synergies arising from the invention's novelty and non-obviousness increase when the invention is practiced with increasing numbers of individuals, entities, users, and/or institutions. Appropriate usage of computerized and/or communication means, e.g., web-based hardware and/or software, cellular and land-based telephonic equipment, and antenna-based, satellite and coaxial and/or ethernet cable/wire technologies, allow for further synergies, thereby rendering the invention more non-obvious that that described in the printed references that do not disclose the above-identified computerized and/or communication means.

It is to be understood that, while the invention has been described in conjunction with the preferred specific embodiments thereof, the foregoing description merely illustrates and does not limit the scope of the invention. Numerous alternatives and equivalents exist which do not depart from the invention set forth above. Other aspects, advantages, and modifications within the scope of the invention will be apparent to those skilled in the art to which the invention pertains.

All patents and publications mentioned herein are hereby incorporated by reference in their entireties to the fullest extent not inconsistent with the description of the invention set forth above.

The invention claimed is:

1. An Internet-of-Things electronic device comprising:
a computer processor;
a communication device configured for external communication; and
non-transitory computer-readable computer memory including computer-executable instructions stored thereon, wherein when executed by the computer processor the computer-readable instructions cause the computer processor to—
receive, via the communication device, a call to a job smart agent residing in the computer-readable computer memory, the job smart agent comprising a behavior profile and a plurality of attributes, the behavior profile being configured to represent normal performance of a job corresponding to the job smart agent by a system administrator and the plurality of attributes including a plurality of calls respectively to a plurality of task smart agents and a plurality of clock cycles respectively corresponding to the plurality of task smart agents,
issue the plurality of calls to the plurality of task smart agents,
initiate a cycle clock for each of the plurality of clock cycles in correspondence with issuance of the plurality of calls,
compare performance of the job smart agent in response to the call to the job smart agent against the behavior profile to determine a deviation by the system administrator from the normal job performance, the determination including determining that a time out has occurred on one or more of the plurality of clock cycles, the time out corresponding to a failure of the system administrator to call the corresponding one of the plurality of task smart agents before expiration of an age threshold,
transmit an objection based on the deviation, via the communication device, to a remote server.

2. The Internet-of-Things electronic device of claim 1, wherein the computer processor comprises a finite state machine.

3. The Internet-of-Things electronic device of claim 1, further comprising a sensor, wherein determination of the deviation includes comparison of data from the sensor against the behavior profile.

4. The Internet-of-Things electronic device of claim 1, wherein the plurality of task smart agents reside in memory of one or more external devices, and the plurality of calls to the plurality of task smart agents are issued via the communication device to the one more external devices.

5. The Internet-of-Things electronic device of claim 1, wherein, when executed by the computer processor, the computer-readable instructions further cause the computer processor to update the behavior profile based on the objection.

6. A computer-implemented method for tracking performance of an Internet-of-Things electronic device, comprising, via a computer processor of the electronic device:
receiving a call to a job smart agent, the job smart agent comprising a behavior profile and a plurality of attributes, the behavior profile being configured to represent normal performance of a job corresponding to the job smart agent by a system administrator and the plurality of attributes including a plurality of calls respectively to a plurality of task smart agents and a plurality of clock cycles respectively corresponding to the plurality of task smart agents;
issuing the plurality of calls to the plurality of task smart agents;
initiating a cycle clock for each of the plurality of clock cycles in correspondence with issuance of the plurality of calls;
comparing performance of the job smart agent in response to the call to the job smart agent against the behavior profile to determine a deviation by the system administrator from the normal performance, the determination including determining that a time out has occurred on one or more of the plurality of clock cycles, the time out corresponding to a failure of the system administrator to call the corresponding one of the plurality of task smart agents before expiration of an age threshold; and transmitting an objection based on the deviation to a remote server.

7. The computer-implemented method of claim 6, wherein the computer processor comprises a finite state machine.

8. The computer-implemented method of claim 6, wherein determination of the deviation includes comparison of data from a sensor of the electronic device against the behavior profile.

9. The computer-implemented method of claim 6, wherein the plurality of task smart agents reside in memory of one or more external devices, and the plurality of calls to the plurality of task smart agents are issued via a communication device to the one more external devices.

10. The computer-implemented method of claim 6, further comprising updating the behavior profile based on the objection.

11. Non-transitory computer-readable storage media having computer-executable instructions for tracking performance of an Internet-of-Things electronic device, wherein when executed by a computer processor of the electronic device the computer-readable instructions cause the computer processor to:

receive a call to a job smart agent, the job smart agent comprising a behavior profile and a plurality of attributes, the behavior profile being configured to represent normal performance of a job corresponding to the job smart agent by a system administrator and the plurality of attributes including a plurality of calls respectively to a plurality of task smart agents and a plurality of clock cycles respectively corresponding to the plurality of task smart agents;

issue the plurality of calls to the plurality of task smart agents;

initiate a cycle clock for each of the plurality of clock cycles in correspondence with issuance of the plurality of calls;

compare performance of the job smart agent in response to the call to the job smart agent against the behavior profile to determine a deviation by the system administrator from the normal performance, the determination including determining that a time out has occurred on one or more of the plurality of clock cycles, the time out corresponding to a failure of the system administrator to call the corresponding one of the plurality of task smart agents before expiration of an age threshold; and transmit an objection based on the deviation to a remote server.

12. The computer-readable storage media of claim 11, wherein the computer processor comprises a finite state machine.

13. The computer-readable storage media of claim 11, wherein determination of the deviation includes comparison of data from a sensor of the electronic device against the behavior profile.

14. The computer-readable storage media of claim 11, wherein when executed by the computer processor the computer-readable instructions further cause the computer processor to update the behavior profile based on the objection.

* * * * *